United States Patent
Schabes et al.

(10) Patent No.: US 7,120,627 B1
(45) Date of Patent: Oct. 10, 2006

(54) METHOD FOR DETECTING AND FULFILLING AN INFORMATION NEED CORRESPONDING TO SIMPLE QUERIES

(75) Inventors: Yves Schabes, Newton, MA (US); Emmanuel Roche, Belmont, MA (US)

(73) Assignee: Global Information Research and Technologies, LLC, Boston, MA (US)

(*) Notice: Subject to any disclaimer, the term of this patent is extended or adjusted under 35 U.S.C. 154(b) by 477 days.

(21) Appl. No.: 10/305,221

(22) Filed: Nov. 26, 2002

Related U.S. Application Data

(63) Continuation-in-part of application No. 10/004,952, filed on Dec. 5, 2001, and a continuation-in-part of application No. 09/845,571, filed on Apr. 30, 2001, and a continuation-in-part of application No. 09/559,223, filed on Apr. 26, 2000, now Pat. No. 6,859,800, said application No. 10/004,952 is a continuation-in-part of application No. 09/559,223.

(60) Provisional application No. 60/333,318, filed on Nov. 26, 2001, provisional application No. 60/200,766, filed on Apr. 28, 2000, provisional application No. 60/251,608, filed on Dec. 5, 2000.

(51) Int. Cl.
  *G06F 17/30* (2006.01)

(52) U.S. Cl. ............... 707/3; 707/6; 715/513

(58) Field of Classification Search ............ 707/1–10, 707/100–104.1, 200–205
See application file for complete search history.

(56) References Cited

U.S. PATENT DOCUMENTS

| | | | | | |
|---|---|---|---|---|---|
| 5,265,065 | A | * | 11/1993 | Turtle | 707/4 |
| 5,303,361 | A | * | 4/1994 | Colwell et al. | 707/4 |
| 5,778,361 | A | * | 7/1998 | Nanjo et al. | 707/5 |
| 5,940,821 | A | * | 8/1999 | Wical | 707/3 |
| 6,081,804 | A | * | 6/2000 | Smith | 707/5 |

* cited by examiner

*Primary Examiner*—Mohammad Ali
(74) *Attorney, Agent, or Firm*—Sam Pasternack; Choate, Hall & Stewart, LLP

(57) ABSTRACT

Described are techniques used in fulfilling an information need not formulated as a natural language question. A query is accepted that includes one or more words not formulated as a natural language question. The query is syntactically analyzed in order to extract a concept from the query. Documents are identified containing the one or more words. The analyzed query is matched to one or more question keys in a structures repository. A best match is determined between the analyzed query and a question key of the structures repository. The key of the at least one best key match is mapped to partially specified queries and the key of the best question key match is mapped to questions representing an information need corresponding to the query. The partially specified queries and questions are matched to potential answers contained in a collection of documents. One or more matching answers are returned based on a metric.

10 Claims, 26 Drawing Sheets

METHOD FOR DETECTING AND FULFILLING AN INFORMATION NEED CORRESPONDING TO SIMPLE QUERIES

RELATED APPLICATIONS

This application claims priority to U.S. provisional application No. 60/333,318, filed Nov. 26, 2001, entitled METHOD FOR DETECTING AND FULFILLING AN INFORMATION NEED CORRESPONDING TO SIMPLE QUERIES, and is a continuation in part of U.S. patent application Ser. No. 09/559,223, filed Apr. 26, 2000 now U.S. Pat. No. 6,859,800, entitled SYSTEM FOR FULFILLING AN INFORMATION NEED, and is a continuation in part of pending U.S. patent application Ser. No. 09/845,571, filed Apr. 30, 2001, entitled SYSTEM FOR ANSWERING NATURAL LANGUAGE QUESTIONS, which claims priority to U.S. provisional application No. 60/200,766, filed on Apr. 28, 2000, and is a continuation in part of pending U.S. patent application Ser. No. 10/004,952, filed Dec. 5, 2001, entitled SYSTEM FOR FULFILLING AN INFORMATION NEED USING AN EXTENDED MATCHING TECHNIQUE, which claims priority to U.S. provisional patent application No. 60/251,608, filed Dec. 5, 2000, and is a continuation in part of U.S. patent application Ser. No. 09/559,223, filed Apr. 26, 2000 now U.S. Pat. No. 6,859,800, all of which are incorporated herein by reference in their entirety.

FIELD OF THE INVENTION

The present invention generally relates to search queries, and more particularly to search queries that may not formulated as a natural language question.

BACKGROUND OF THE INVENTION

Accompanying the rapid growth in the amount of information available in the form of documents stored in databases has come an increased need to efficiently extract information relevant to a specific need. Traditional searching methods search and retrieve documents according to the words in a given input query. Search engines allow users to find documents containing one or more words or phrases, often referred to as keywords, found in the input query and return a list of relevant documents for the input query. For instance, with traditional search and retrieval methods, the input query
   Time Warner
returns a list of documents containing one or both words Time or Warner. Search engines may also permit the formulation of Boolean queries, which allow words in the query to be combined using logical operations such as AND, OR, and NOT. Such operations allow to specify which words must appear in the documents, which words may appear in the documents, and which words may not appear in the documents. For example, using a traditional Boolean search engine, the query
   US AND OPEN AND (NOT golf)
selects documents that contain the word US and Open but not the word golf Another feature that may be used when performing queries with traditional search engines is the ability to trigger a search for phrases in documents. For example the query
   "US Open"
retrieves documents that contain the exact phrase "US Open" while rejecting documents that contain the word US and/or the word Open separately. Examples of search engines offering these capabilities are search engines used with the World Wide Web such as AltaVista™, Lycos™, Inktomi™, InfoSeek™, NorthernLight™, HotBot™, MSN Search™, Google™ and Yahoo™. Additional search engines include those used for searching documents found in databases, digital libraries or other information sources such as Inktomi Enterprise Search™, Verity™, K2 Enterprise, or AltaVista® Search Software.

The result of a search using search engines such as those mentioned above is a list of relevant documents, generally displayed in some order, for example, from the most relevant document to the least relevant document. To present documents in an order, search engines rank the documents according to some metric. Typically, the ranking will first show documents containing the highest number of keywords.

For example, referring to FIG. 1, screen display 10 shows the result of a search on Google™ (http://www.google.com) for the query Time Warner. The screen display 10 shows the first 3 documents ranked from the most relevant document to the least relevant document. Each of the results consists of a description of a document. Such description, for example, may include the title of the document, a description of the document, and its Internet Uniform Resource Locator (URL).

One form of output of traditional search engines that may be queried are documents which match words in the input query. Although documents may be what users are seeking when using traditional search engines, it may also be that a user is seeking information other than document names or URLs.

For example, as illustrated in the screen display 20 of FIG. 2, a user who is seeking the names of tennis players who won the US Open tournaments, may issue the query
   tennis US Open winners
The above-referenced query may be an input query to a traditional search engines which display as query results the documents including words from the input query. It may be the case that the user is looking for the actual names of tennis players who won the US Open.

As another example, as illustrated in the screen display 30 of FIG. 3, a user seeking the movie titles in which Bruce Willis appears may issue the query Bruce Willis movies. As shown in screen display 30, a traditional search engine may return as a query result the documents in which the input query terms appear rather than the movie titles. Screen display 40 of FIG. 4 also illustrates the return of documents in response to an input query of Oregon senators.

In the foregoing description as illustrated in the screen displays 10, 20, 30 and 40, conventional search engines and World Wide Web search engines expect that the user is seeking documents that include particular term or terms of an input query. It may be desirable to provide a search engine, for example, with the ability to return information besides documents and to infer additional information that a user may be seeking based on a particular input query.

For example, when a user issues the query tennis US Open winners, the user may be seeking the names of the tennis players who won the US Open. Traditional search engines are unable to recognize that a user is seeking the names of tennis players and not looking for documents including the terms from the input query. Similarly, the query Oregon senators, may be intended to seek the names of senators of Oregon and not to seek documents. As yet another example used above, when a user issues the query Bruce Willis movies, the user may not be looking for the actual documents including input query terms, but may rather be looking for the titles of movies in which Bruce Willis appears.

Question-answering systems, for example, such as described in pending U.S. patent application Ser. No. 09/845,571, filed Apr. 30, 2001, entitled SYSTEM FOR ANSWERING NATURAL LANGUAGE QUESTIONS, (hereinafter "the Question Answering application"), may be used to provide answers to questions. However, the foregoing systems expect input in the form of a question. For example, a user seeking for the names of senators of Oregon, may issue the question Who are the senators of Oregon?

Although question-answering systems will give the names of senators of Oregon as results, the user is expected to type a question and is unable to issue a short and simple query as senators of Oregon.

The foregoing question-answering systems may suffer from a drawback in that the user is expected to input a question, and may not accept as input short queries which do not form a question. Furthermore, users of traditional search engines and systems may be more inclined to type short keyword queries (e.g., one, two or at most three words) than to enter input queries in the form of questions which may be much longer (e.g., more than five words).

It may also be desirable to have a system and method for inferring additional information from a query and provide as output answers in response to the inferred additional information. It may also be desirable to provide the document lists produced in accordance with the original input query terms. It may also be desirable to provide document lists in accordance with terms of the inferred information.

SUMMARY OF THE INVENTION

In accordance with one aspect of the invention is a method of fulfilling an information need. An input query is obtained. The input query includes at least one user-specified search term. The input query is converted into a converted input query. The converted input query is used to obtain a result wherein said result does not include said at least one user-specified search term included in said input query.

In accordance with another aspect of the invention is a data structure stored in a computer memory. The data structure includes: at least one key field describing an input query format, and at least one of: a statement format field specifying an alternate form in which data included in said input query format may be specified as an affirmative statement; and a question format field specifying data included in said input query format as a question.

In accordance with another aspect of the invention is a method for determining a result to an input query. It is determined whether the input query matches an input query format. If the input query matches the specified input query format, at least one alternate form is determined in which data included in the input query format may be specified as at least one of: an affirmative statement of a question and a question. The result is determined using the at least one of said affirmative statement and the question. The result does not include user-specified search terms of said input query.

In accordance with yet another aspect of the invention is a computer program product for fulfilling an information need comprising: executable code that obtains an input query including at least one user-specified search term; executable code that converts said input query into a converted input query; and executable code that uses said converted input query to obtain a result wherein said result does not include said at least one user-specified search term included in said input query.

In accordance with another aspect of the invention is a computer program product for determining a result to an input query comprising: executable code that determines whether said input query matches an input query format; executable code that, if said input query matches said specified input query format, determines at least one alternate form in which data included in said input query format may be specified as at least one of: an affirmative statement of a question and a question; and executable code that determines said result using said at least one of said affirmative statement and said question, said result not including user-specified search terms of said input query.

In accordance with another aspect of the invention is a method of fulfilling an information need not formulated as a natural language question. A query is accepted that includes one or more words not formulated as a natural language question but which corresponds to an information need. One or more answer are returned that satisfy the information need.

BRIEF DESCRIPTION OF THE DRAWING

Features and advantages of the present invention will become more apparent from the following detailed description of exemplary embodiments thereof taken in conjunction with the accompanying drawings in which.

DETAILED DESCRIPTION OF PREFERRED EMBODIMENTS

Described herein are techniques used for producing answers and optionally documents corresponding to a query which is may not be formulated as a question.

Figure 1:
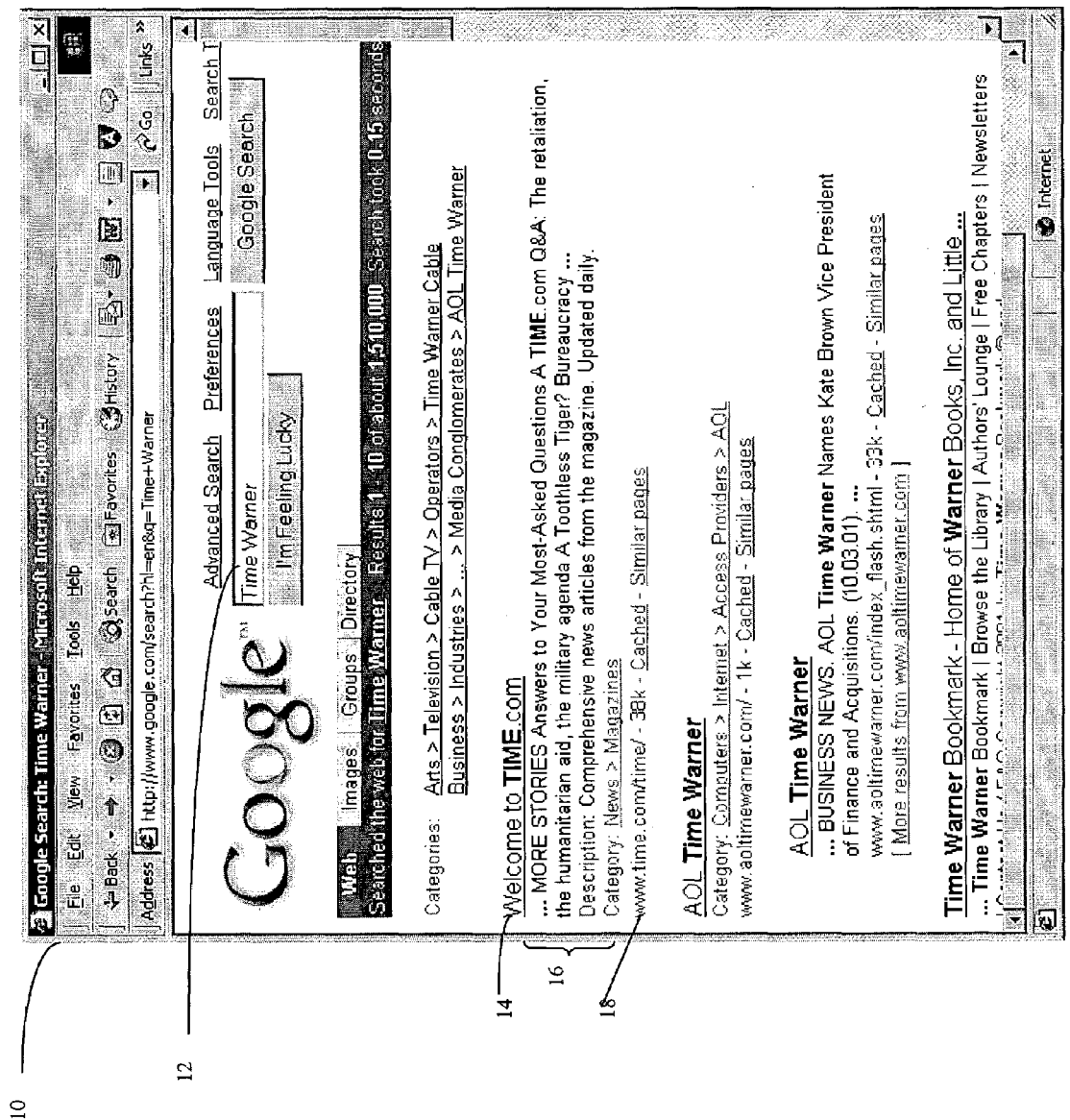
FIG. 1 is an example of a screen display of Google Search Results for the Query Time Warner.
Figure 2:
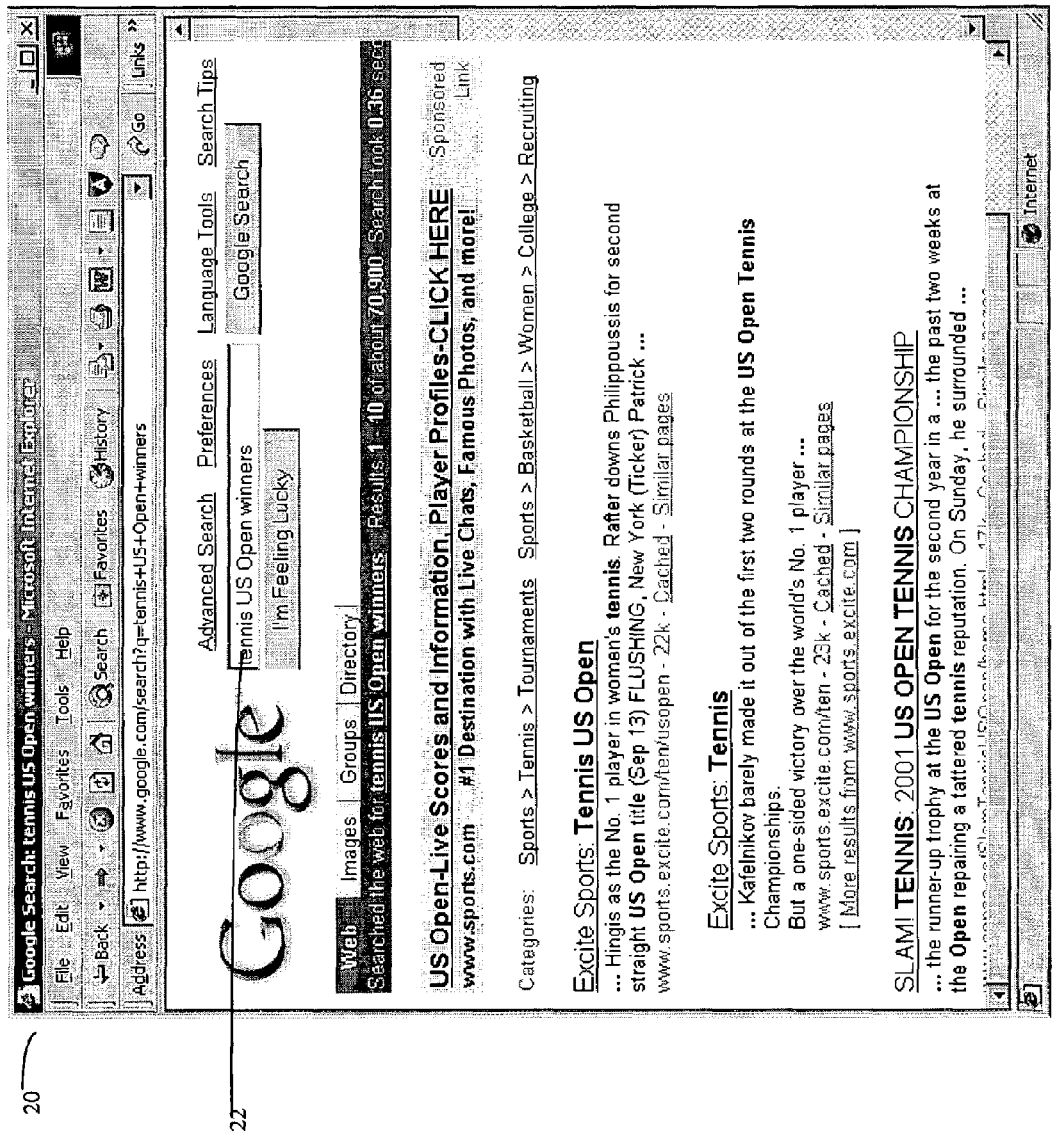
FIG. 2 is an example of a screen display of Google search results for the query tennis US Open winners.
Figure 3:
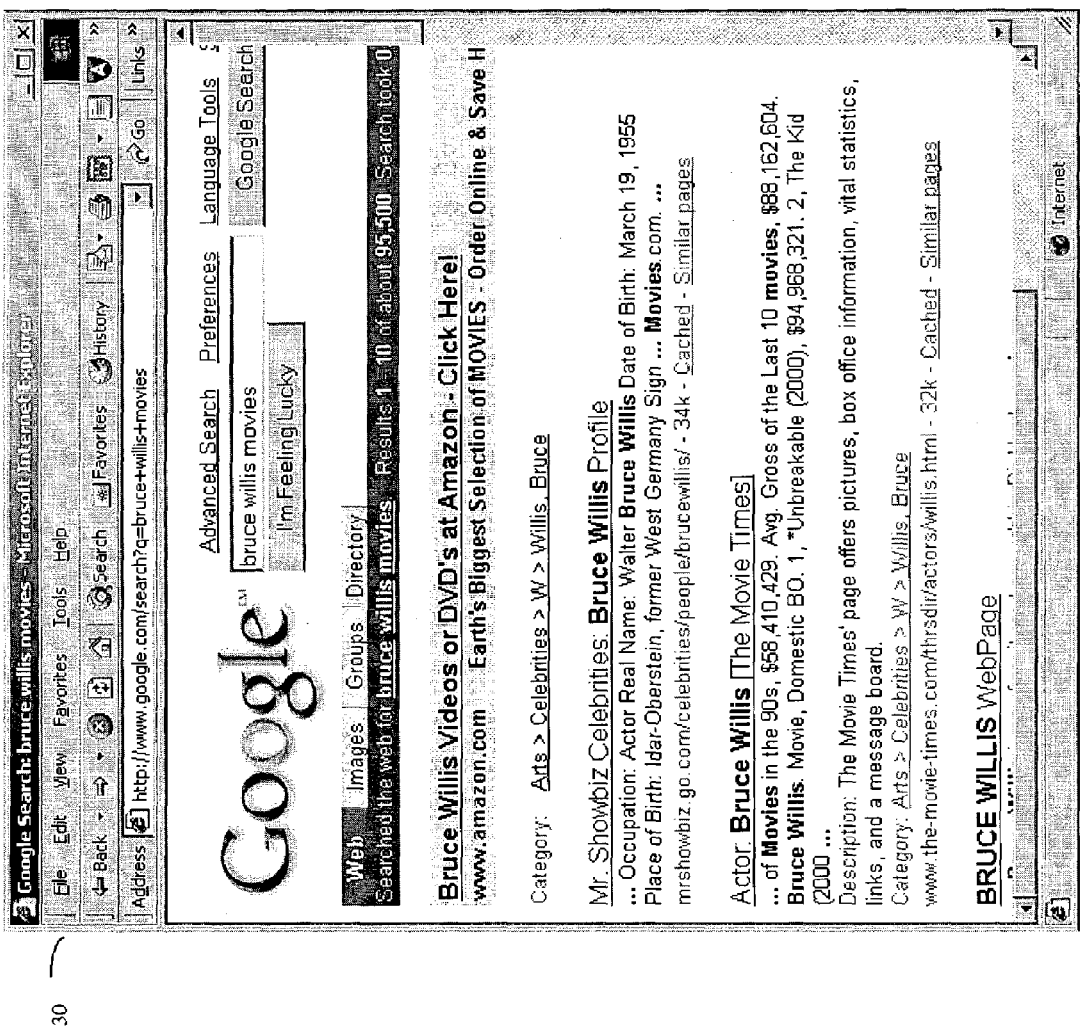
FIG. 3 is an example of a screen display of Google search results for the query Bruce Willis movies.
Figure 4:
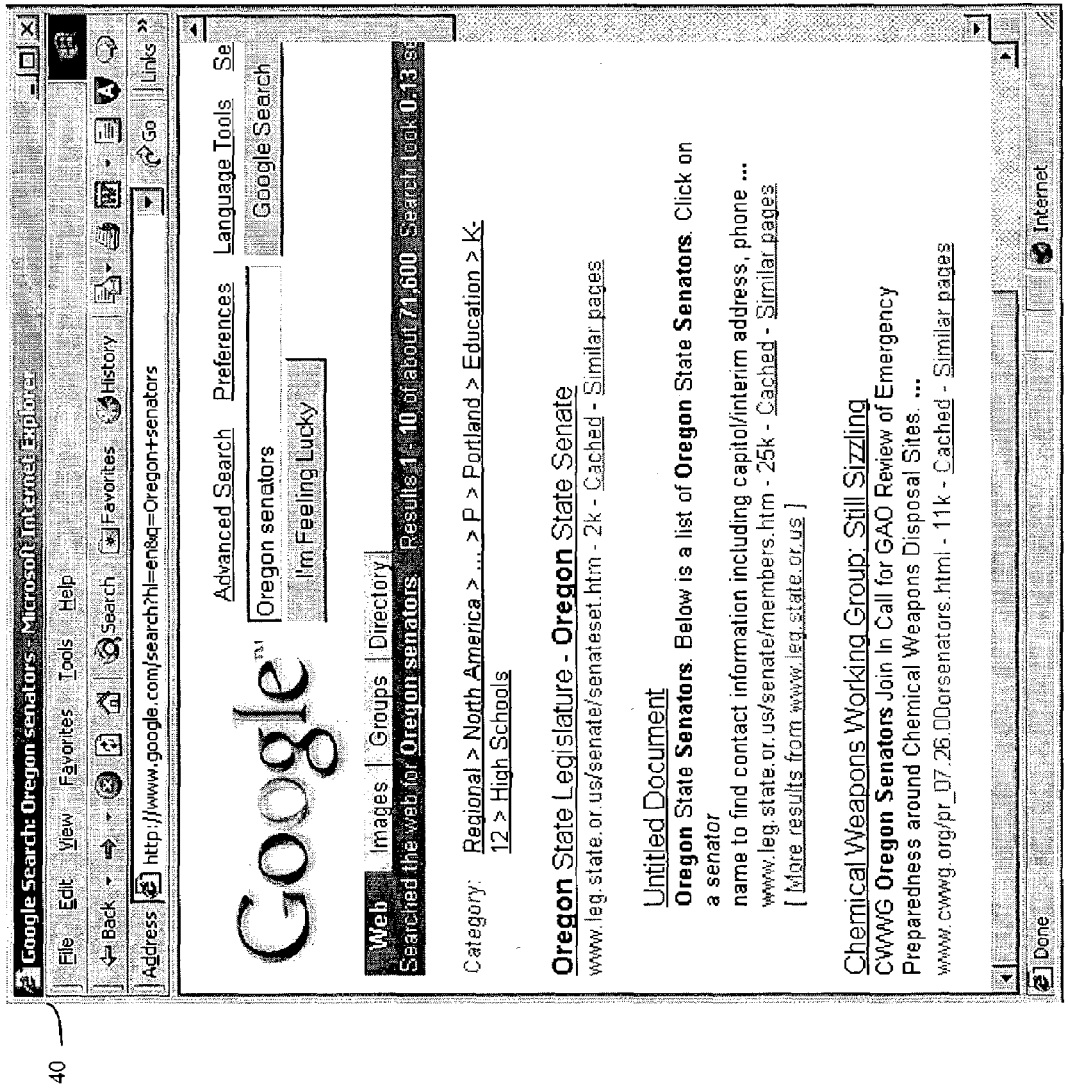
FIG. 4 is an example of a screen display of Google search results for the query Oregon senators.
Figure 5:
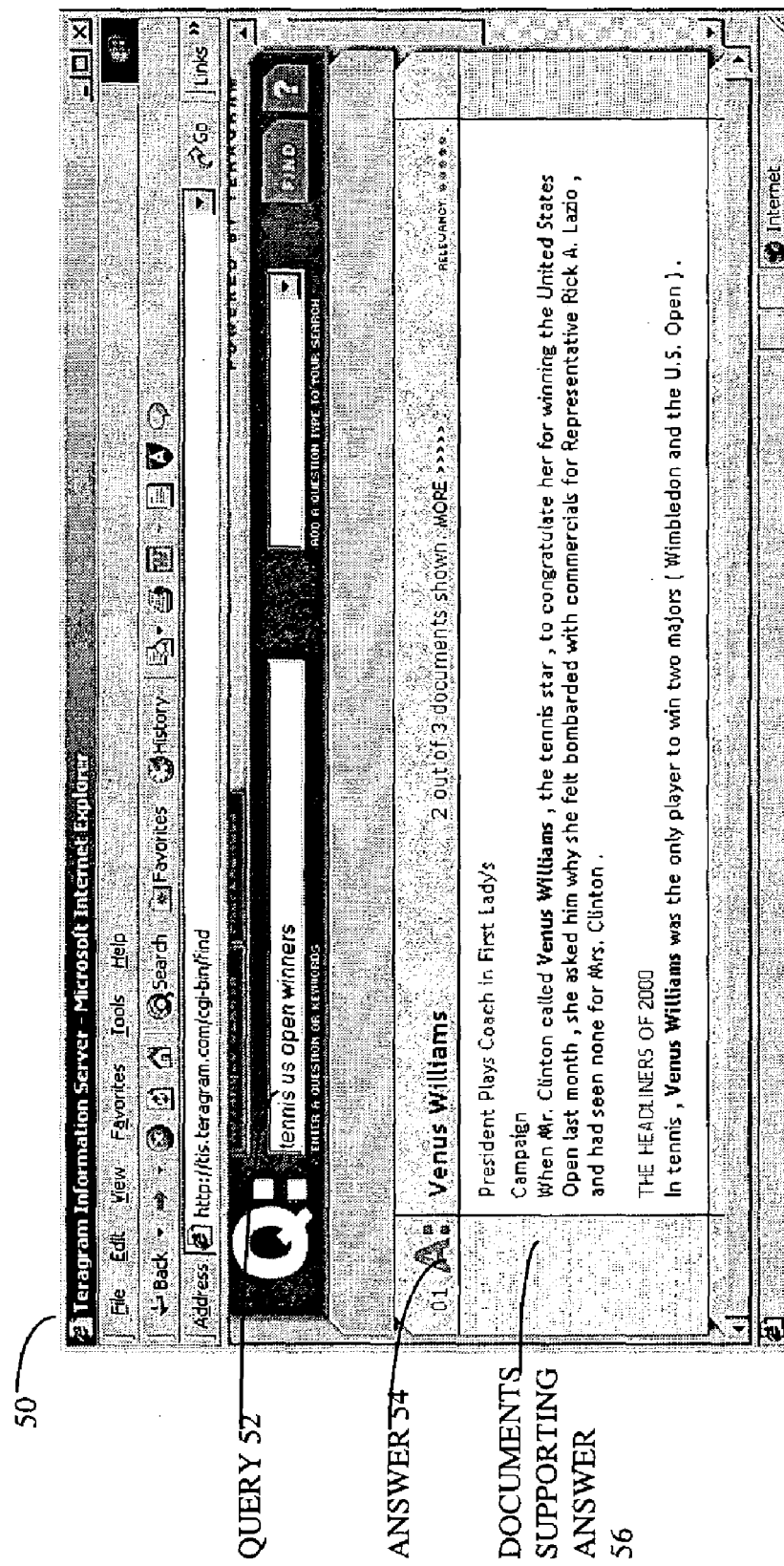
FIG. 5 is an example of a screen display including answers in response to the query tennis us open winners.
Figure 6A:
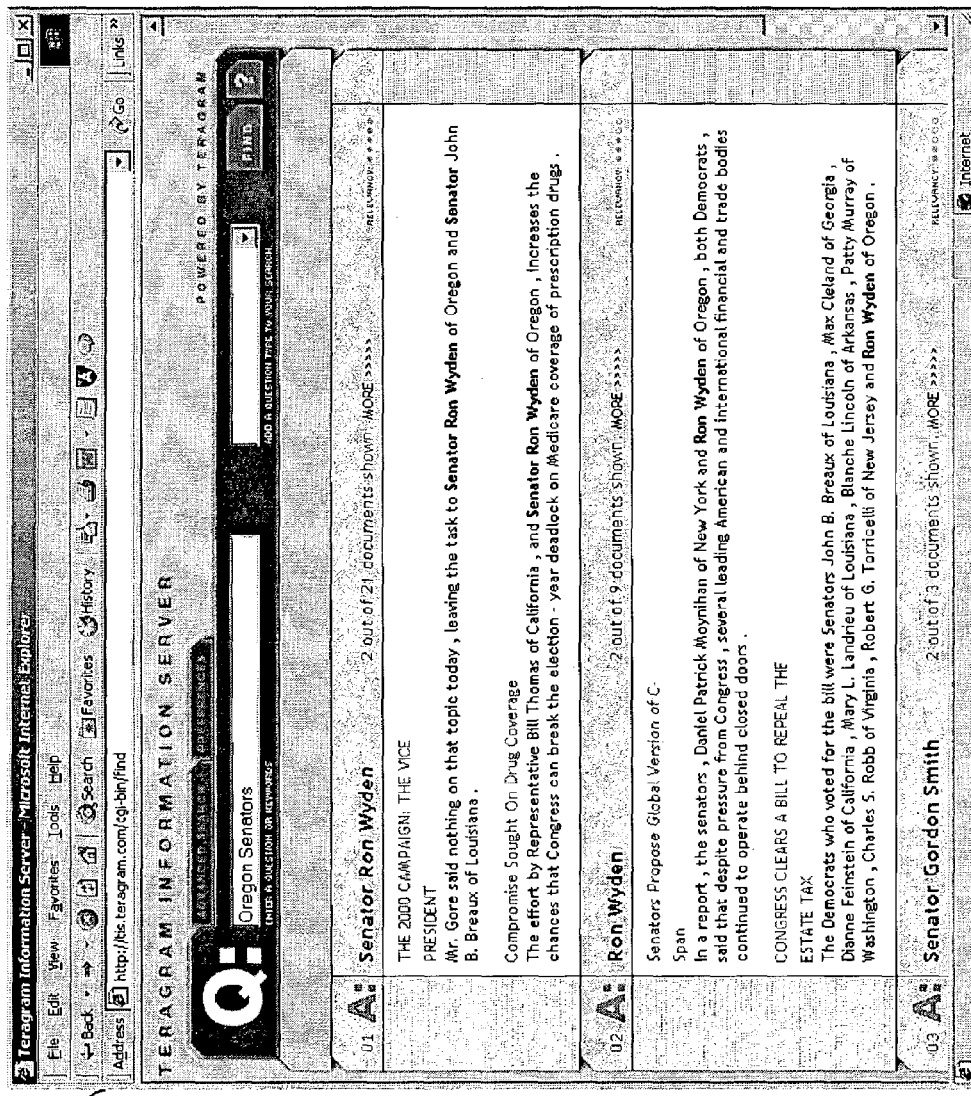
FIGS. 6A–6D are additional examples of screen displays including answers in response to an input query with search results supporting the answer.
Figure 6B:
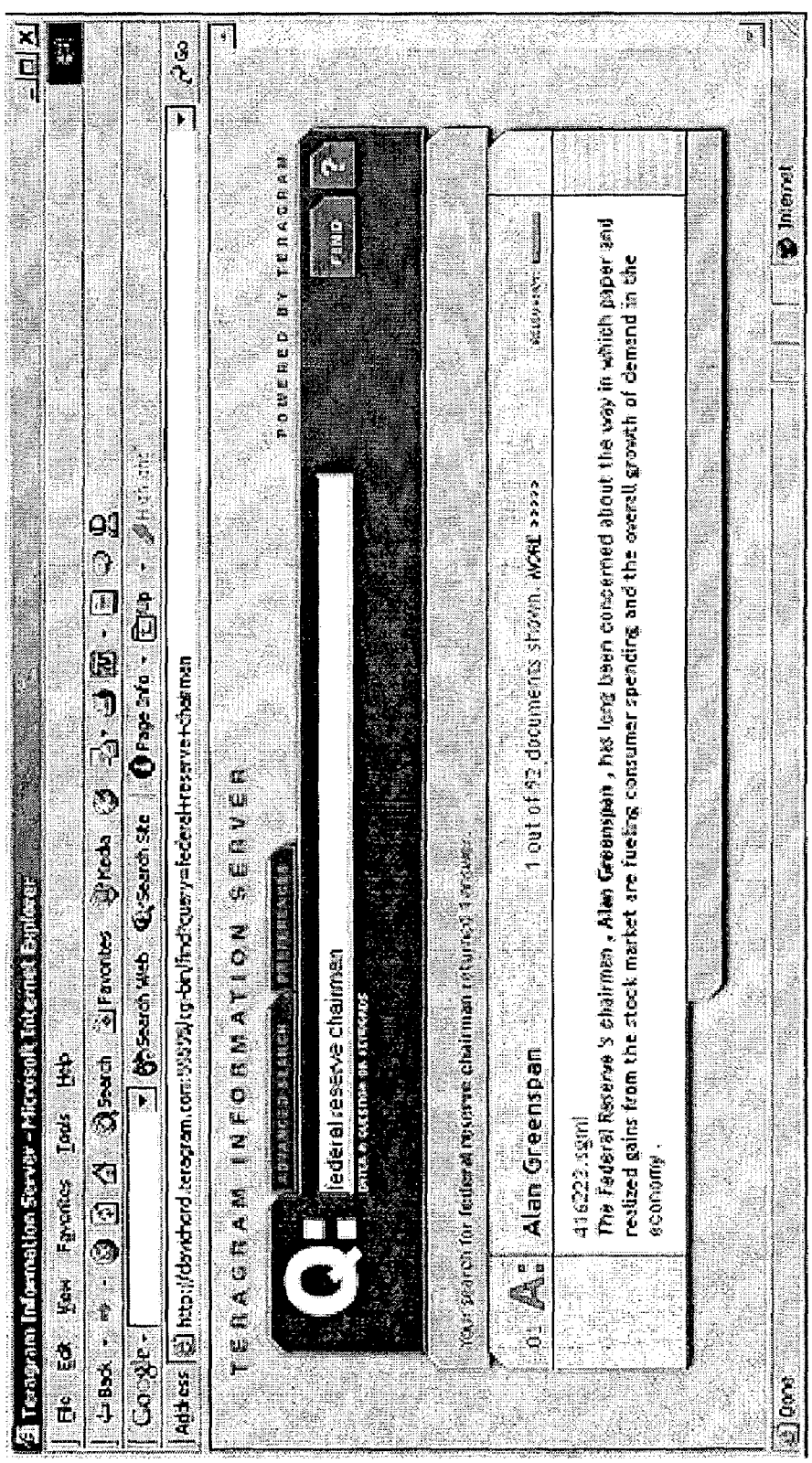
Figure 6C:
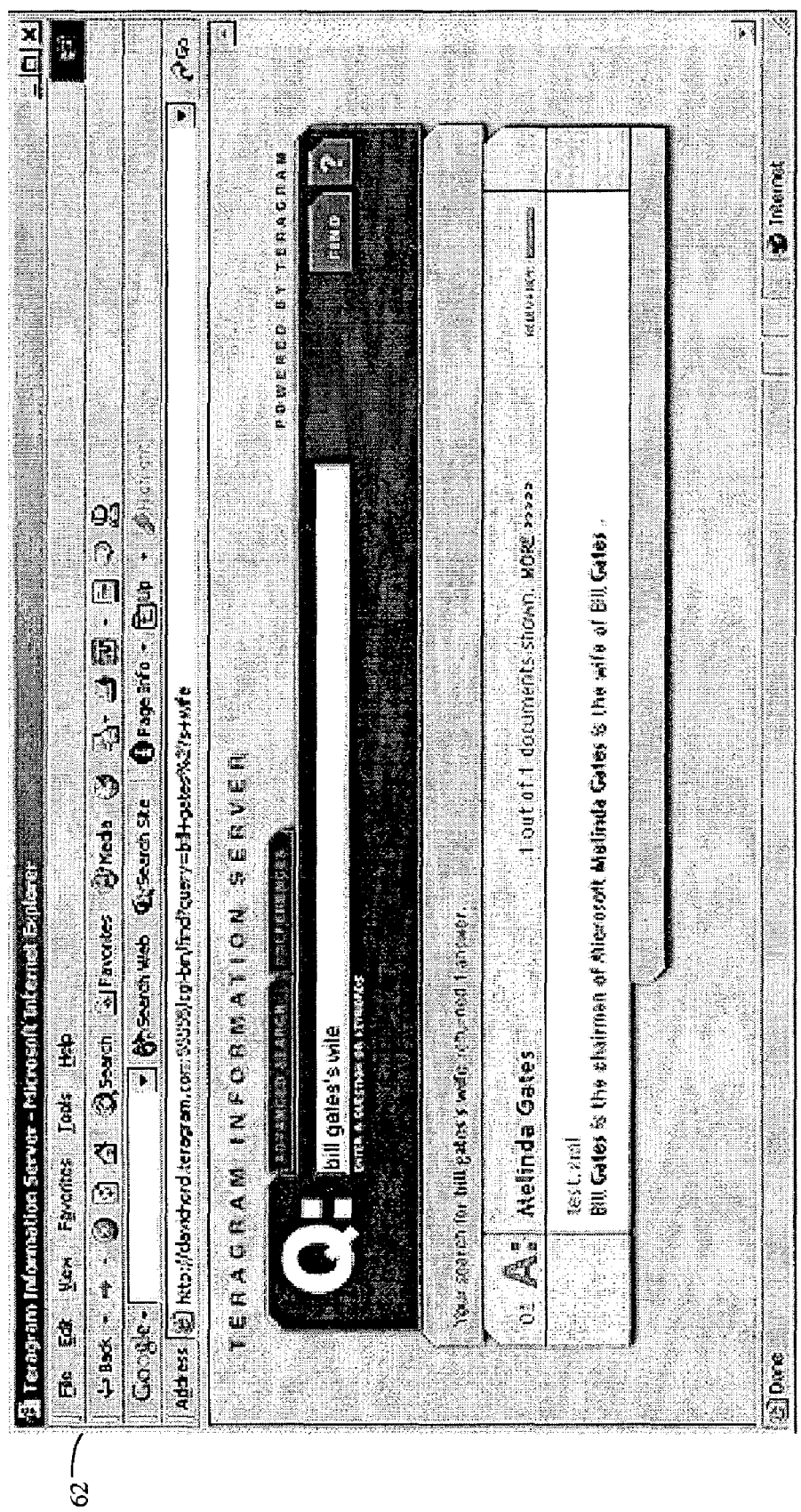
Figure 6D:
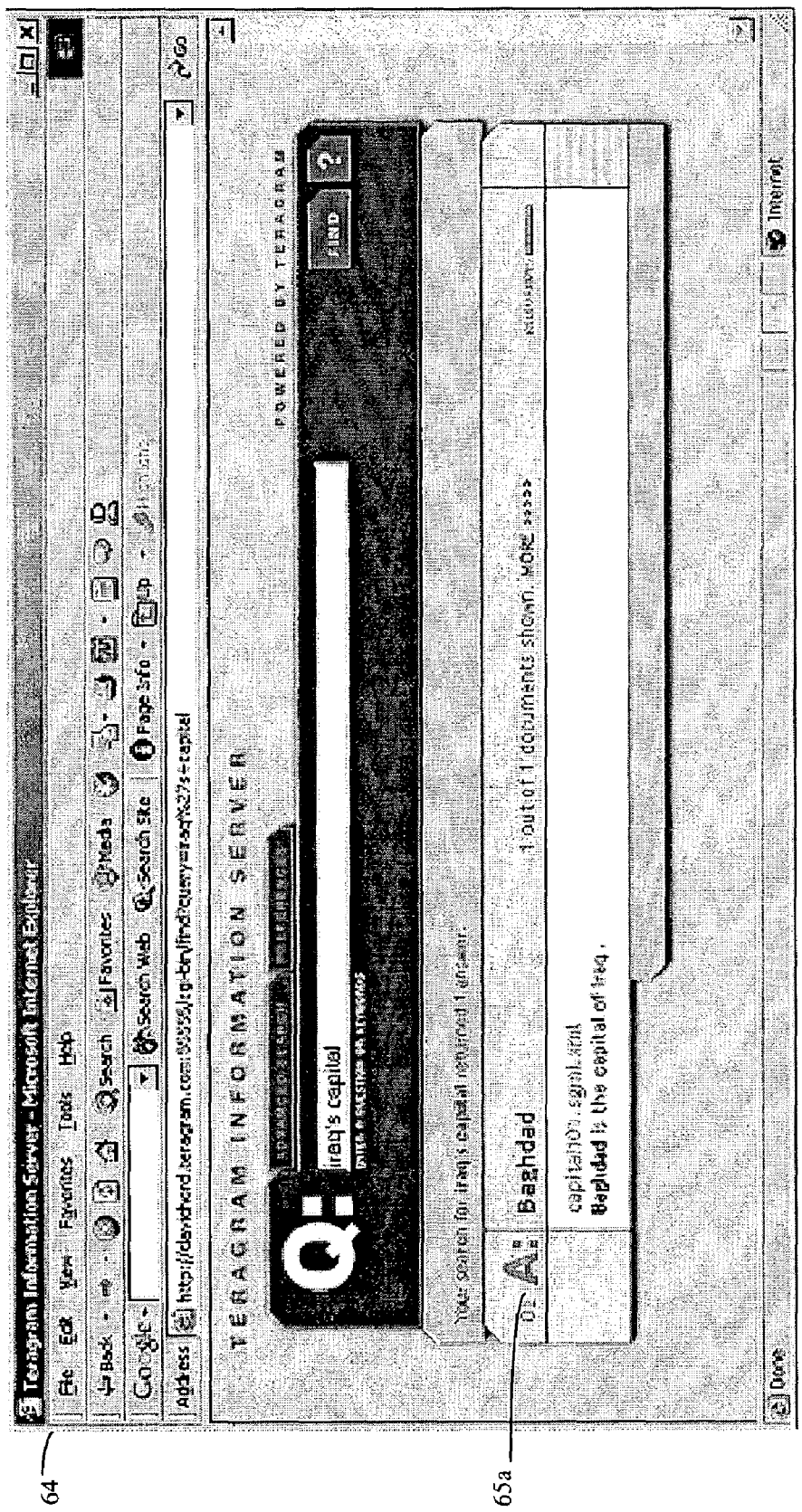

Referring now to FIG. 5, shown is an example of a screen display 50 displaying an answer to an input query not in the form of a natural language question. The input query 52 is tennis US open winners. Using the techniques described herein, the input query may be transformed and processed as a question, or alternatively, using Information Need Processing, which is described in more detail elsewhere herein. The techniques described herein may be used to infer, through analysis of the input query, that the user is searching for information other than as specified in the exact terms and format of the input query. In this instance, it may be inferred that the user is searching for information other than documents with the search terms of the input query. Rather, it may be inferred that the user is searching for the names of the winners of the US tennis open. An answer 54 is displayed in accordance with the input query 52. Additionally, in this example, documents 56 are displayed that include the terms of the answer 54. In this instance, the information the user needs may be inferred from the data query. Techniques described herein may be used to infer what information a user may desire by analyzing the input query to infer a question even though the input query is not in the form of a natural language question.

FIGS. 6A–6D are screen displays similarly showing an answer produced by inferring additional information from the input query and subsequently searching and outputting document passages and/or listings including the answer. In connection with FIGS. 6A–6D, a question was inferred from the input query even though the input query is not in the form of a natural language question.

Figure 7A:
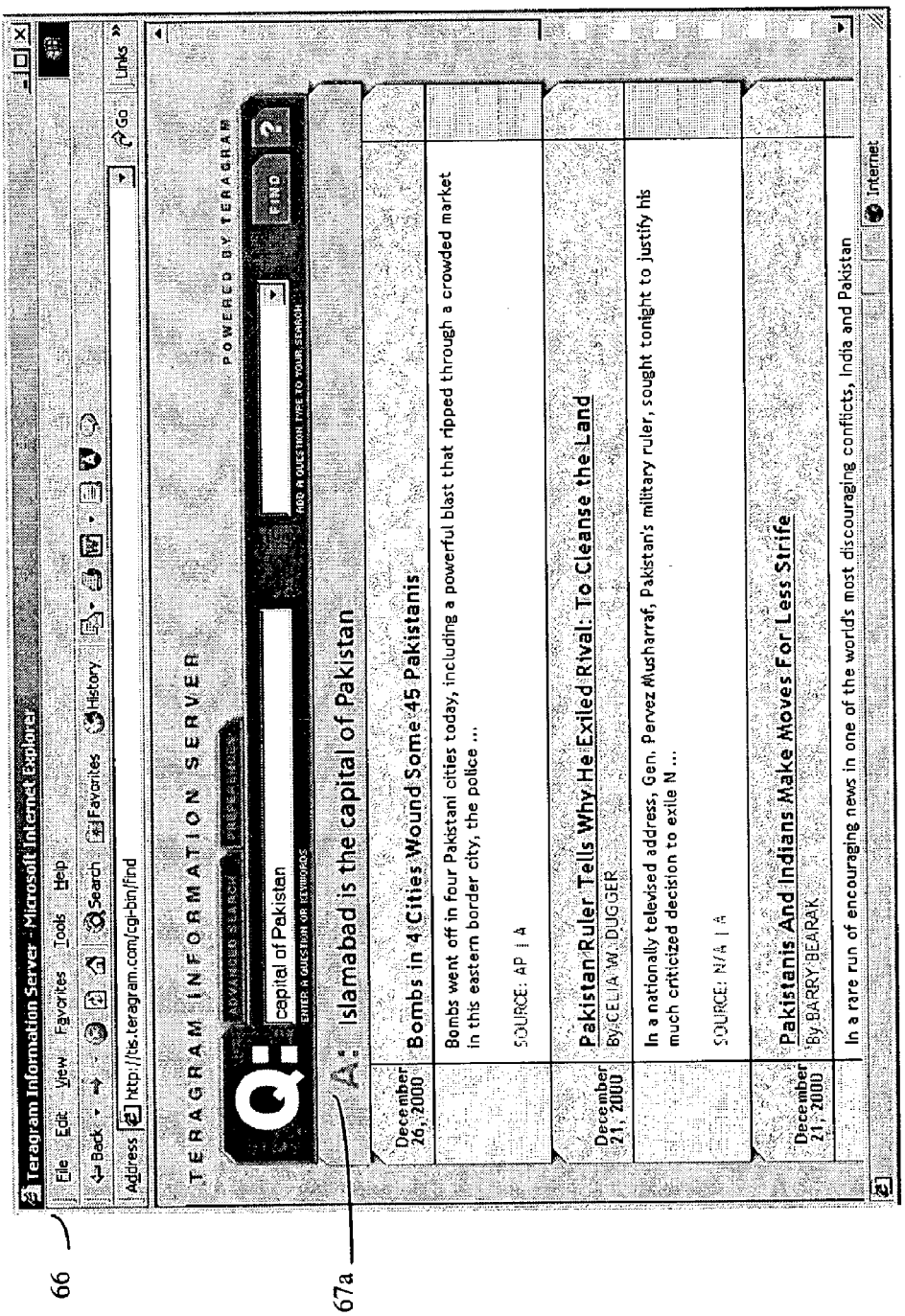
FIGS. 7A–7C are examples of screen displays including answers and Documents shown for an input query.
Figure 7B:
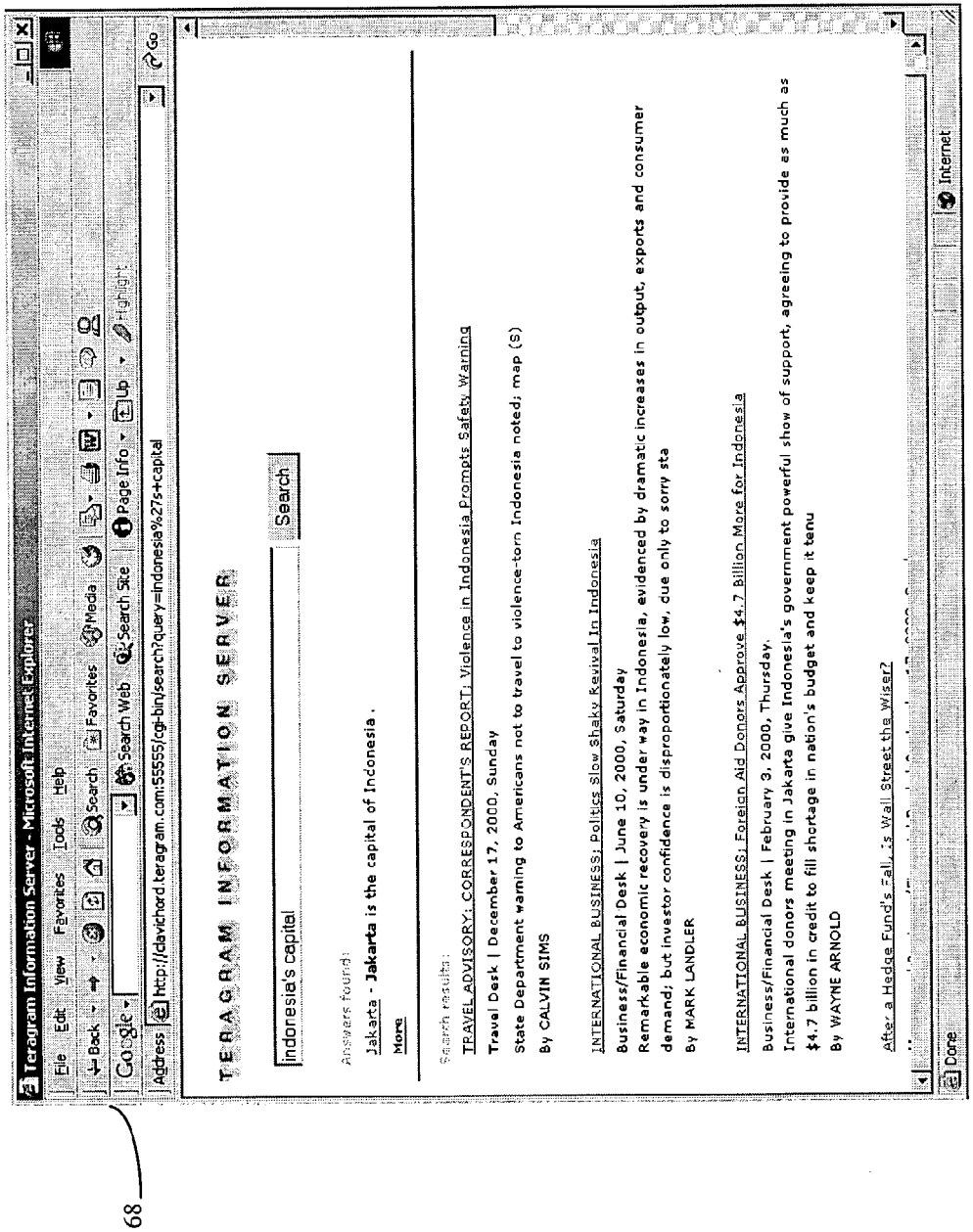
Figure 7C:
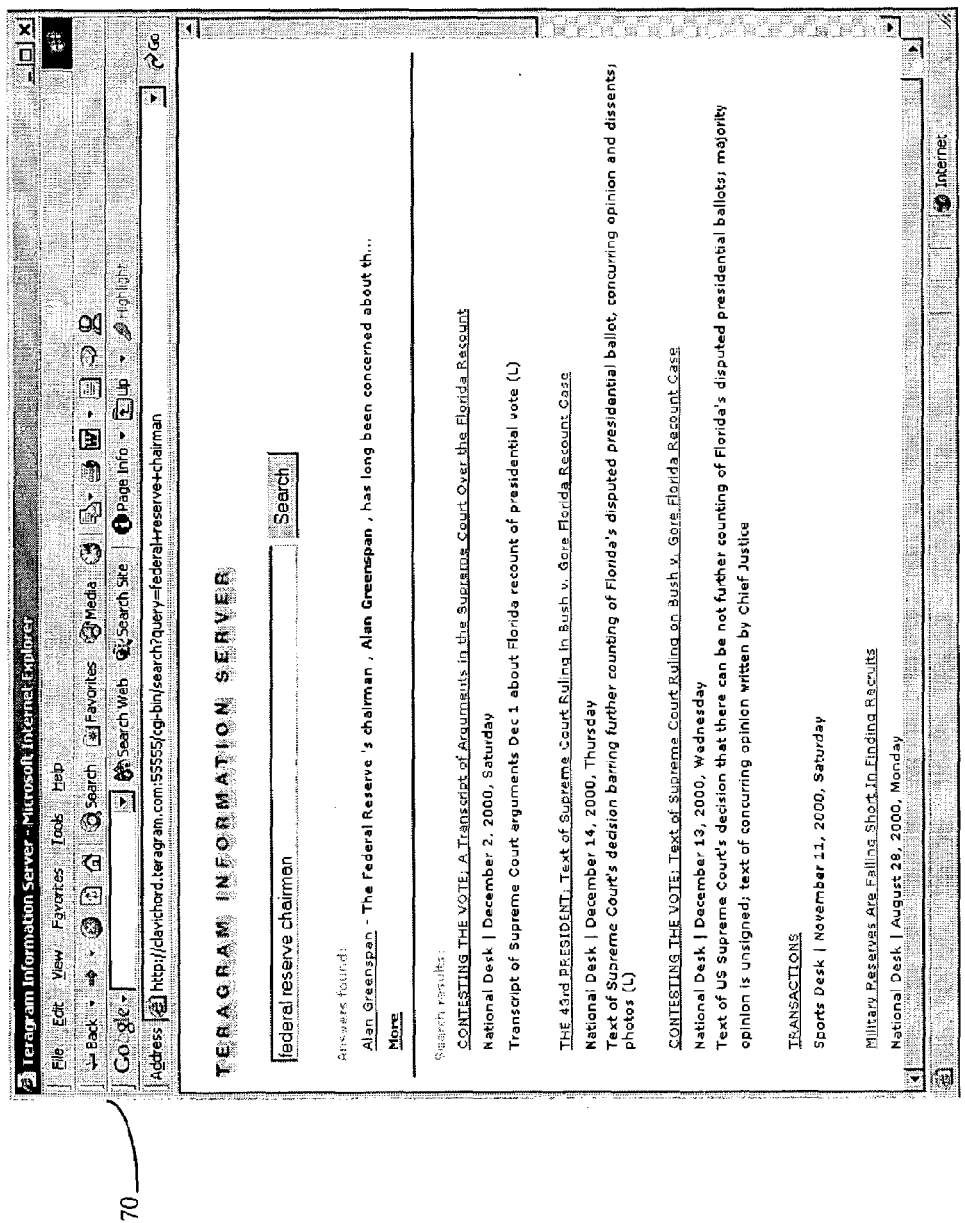

FIGS. 7A–7C are screen displays showing an answer that may be formulated using techniques described herein. Additionally, traditional document search results, for example, such as those obtained using the Google search engine, may be displayed which include query results determined in accordance with the original input query rather than the answer, as described in connection with FIG. 5.

Referring to FIG. 7A, it should be noted that the answer field displaying results corresponding to an original input query may be an affirmative statement, for example, as displayed in the answer field 67a, denoted "A:". As described elsewhere herein in more detail, an embodiment may transform an original input query into a converted input query. The converted input query may be in any one or more of several different forms including, for example, one or more affirmative statements and/or one or more questions. In connection with FIG. 7A, software and/or hardware included on a query server processing an input query may transform the original input query into an affirmative statement and/or a question. The results for the given input query, independent of whether the converted input query is a question and/or an affirmative statement, may be displayed, for example, as in the answer field 67a.

It should be noted that an embodiment may display results as an "answer" in any one of a variety of different forms and formats. As an example, in contrast to the affirmative statement answer format 67a of FIG. 7A including a complete sentence, FIG. 6D includes an alternative answer display format. The screen display 64 of FIG. 6D includes an answer field 65a which displays only the answer, which in this example is a single word. As described elsewhere herein, the query server may transform the input query into one or more converted input queries. The converted input queries may be in a question format and/or an affirmative statement format. The format of the answer field 67a may be displayed independent of the type of converted input query. In other words, the answer field format 65a may be used in connection with embodiments utilizing converted input queries that are questions and/or affirmative statements.

It should be noted that the techniques described in following paragraphs may be used to infer, for example, a question, from an input query not in the form of a natural language question. These techniques may also be used to infer other forms of information need from the input query such as, for example, alternative affirmative statements.

Figure 7D:
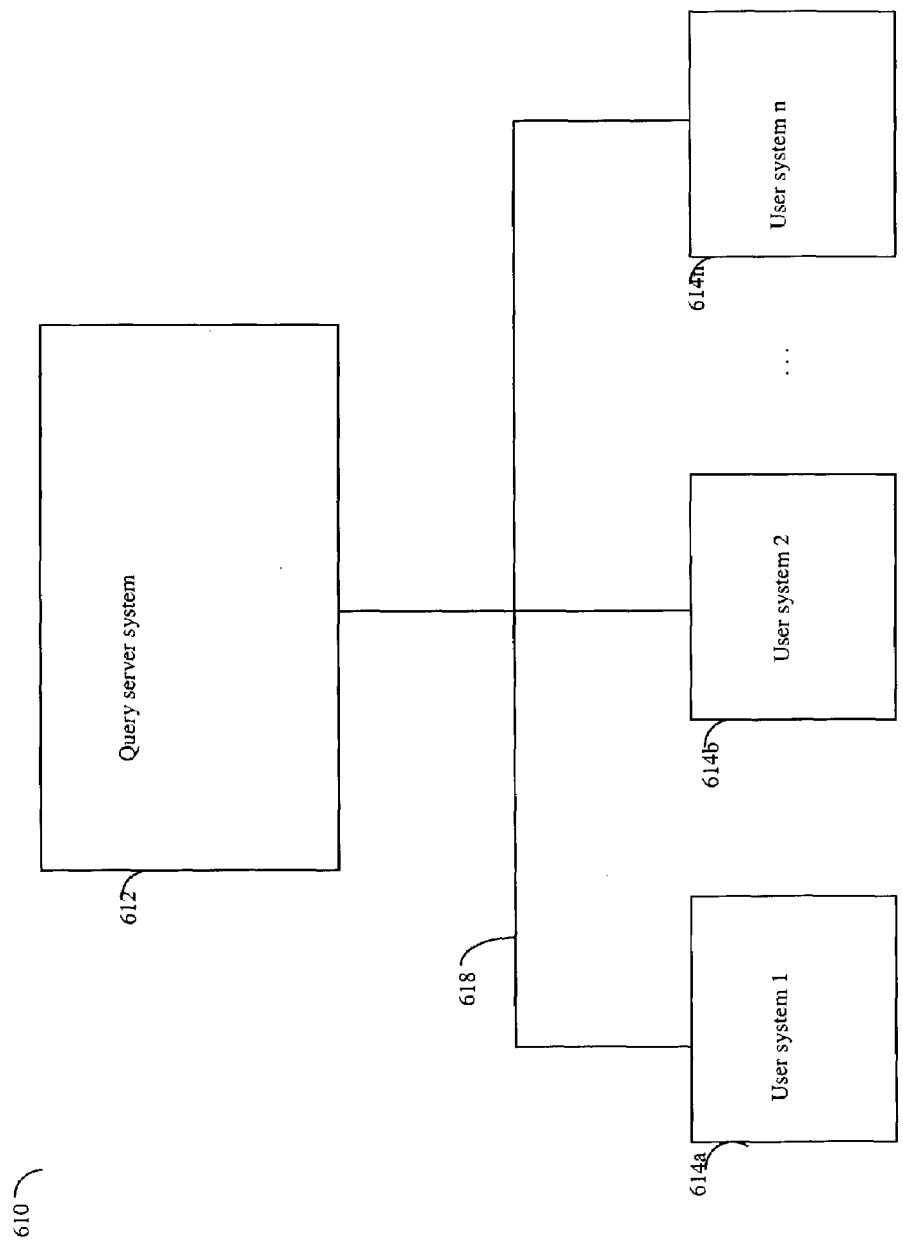
FIG. 7D is an example of an embodiment of a computer system.

Referring now to FIG. 7D, shown is an example of an embodiment of a computer system according to the present invention. The computer system 610 includes a query server system 612 connected to user systems 614a–614n through communication medium 618. In this embodiment of the computer system 610, the N user systems 614a–614n may communicate with the query server system 612, for example, in performing input/output (I/O) operations or data requests. The communication medium 618 may be any one of a variety of networks or other type of communication connections as known to those skilled in the art. The communication medium 618 may be a network connection, bus, and/or other type of data link, such as a hardwire or other connections known in the art. For example, the communication medium 618 may be the Internet, an intranet, network or other connection(s) by which the user systems 614a–614n may communicate with the query server system 612, and may also communicate with others included in the computer system 610.

Each of the user systems 614a–614n and the query server system 612 included in the computer system 610 may be connected to the communication medium 618 by any one of a variety of connections as may be provided and supported in accordance with the type of communication medium 618. The processors included in the user computer systems 614a–614n and the query server system 612 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in one embodiment of the user systems 614a–614n and the query server system 612 are described herein in more detail. However, the particulars may vary in accordance with each embodiment. Each of the user computers 614a–614n, as well as the query server system 612, may all be located at the same physical site, or, alternatively, may also be located in different physical locations. Examples of the communication medium that ay be used to provide the different types of connections between the user computer systems and the query server system of the computer system 610 may use a variety of different communication protocols such as SCSI, ESCON, Fibre Channel, or GIGE (Gigabit Ethernet), and the like. Some or all of the connections by which the user systems 614a–614n and the query server system 612 may be connected to the communication medium 618 may pass through other communication devices, such as a Connectrix or other switching equipment that may exist such as a phone line, a repeater, a multiplexer or even a satellite.

Figure 7E:
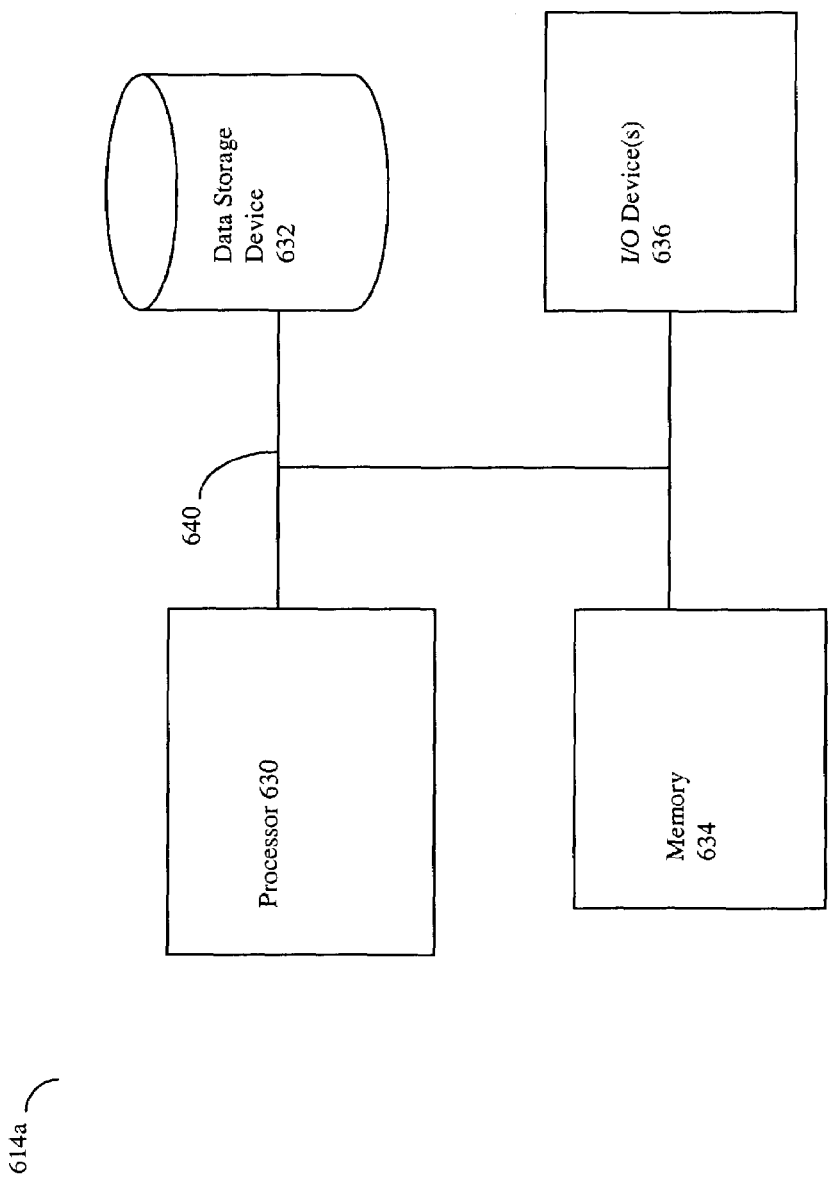
FIG. 7E is an example of an embodiment of components included in a user of the computer system of FIG. 7D.

Referring now to FIG. 7E, shown is an example of an embodiment of the user system 614a. It should be noted that although a particular user system is described herein, other user systems 614b–614n may also be similarly configured. Additionally, it should be noted that each user system 614a–614n may have any one of a variety of different configurations including different hardware and/or software components. Included in this embodiment of the user system 614a is a processor 630, a memory, 634, one or more I/O devices 636 and one or more data storage devices 632. Each of the foregoing may communicate using a bus 640. Each of the components and the bus may be any one of more of a variety of different components in accordance with the parameters of the particular user system 614a.

In one example, a graphical user interface (GUI) may be displayed on an output device of the user system 614a, such as a terminal with a display screen. A data query may be input, as by a keyboard and/or mouse, for example, using the GUI. The data query may be communicated to the query server system 612 over the connection 618, such as the Internet. The results accordingly may be communicated from the query server system to the user system 614a and displayed on an output device of the user system 614a. The GUI may be as described, for example, in connection with FIG. 5.

Figure 7F:
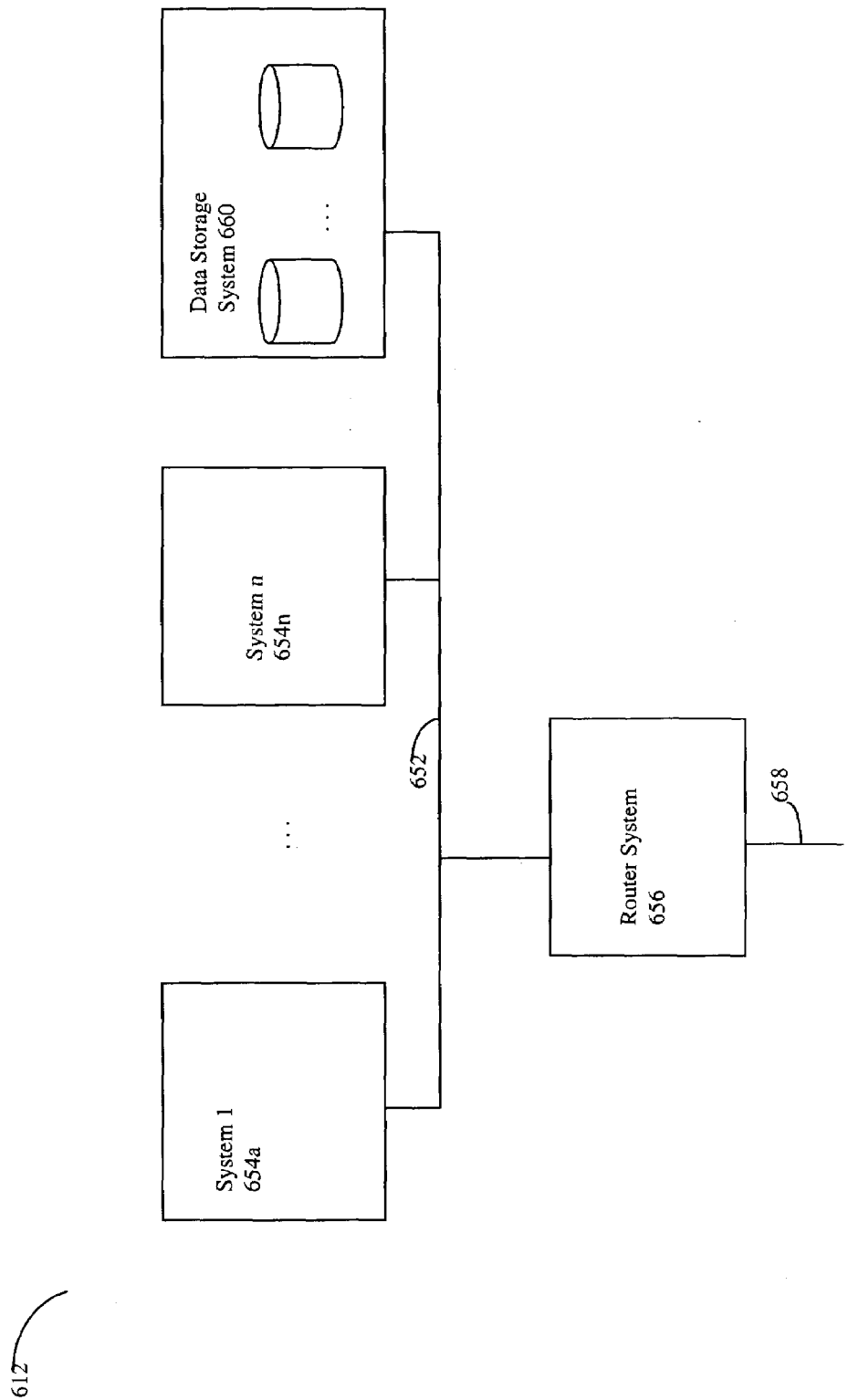
FIG. 7F is an example of an embodiment of components included in the query server system of FIG. 7D.

Referring now to FIG. 7F, shown is an example of an embodiment of the query server system 650. In this example, the query server 650 may include one or more computer systems 654a–654n, a data storage system 660 and a router system 656. The computer systems 654a–654n and the router system 656 may include one or more processors that process the actual data queries. An incoming data query may be received through connection 658 and forwarded to the router system 656. The router system 656 may forward the request further to one or more of the systems 654a–654n for processing. The router and the systems 654a–654n may communicate with each other and the data storage system 660 over the communication connection 652. The data storage system 660 may include one or more data storage devices, for example, such as disks. The router may use any one or more different techniques in determining which system(s) process an incoming request.

As with the user system 614a, the query server system 650 may be any one of variety of different configurations of hardware and/or software components determined in accordance with the parameters of the particular server system. For example, a server system embodiment may not include a router and may include only a single system, such as 654a connected to data storage 660.

Figure 8:
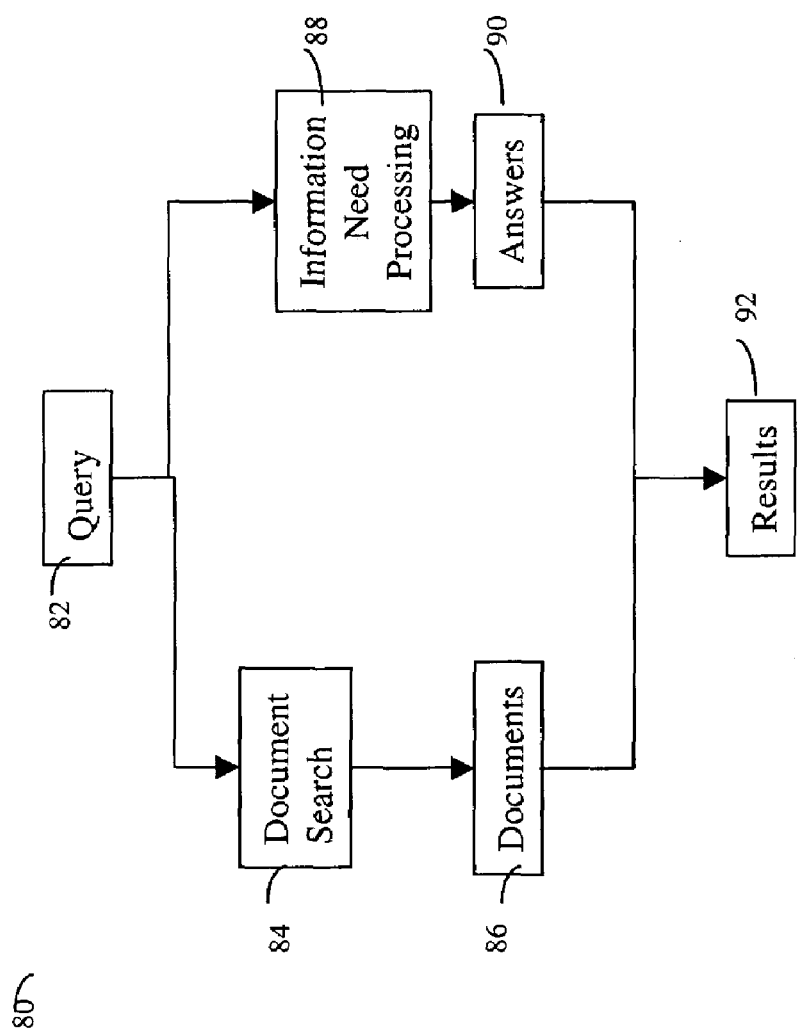
FIG. 8 is an example of a flowchart of steps of a method for providing search results and information need results of queries that may not correspond to natural language questions.

Referring now to FIG. 8, shown is an example of a flowchart 80 of steps of a method for processing an input query that may not be in the form of a natural language question, and providing document search results and information need results. The method steps of flowchart 80 may be performed by the query server system 616. At step 82, an input query is input into a search engine, for example, using a graphical user interface as illustrated in screen displays described elsewhere herein. The input query may be processed by a traditional document search system at step 84 to provide for outputting documents at step 86. At step 88, the input query may also be processed by the Information Processing Module described elsewhere herein, which outputs, at step 90, answers for queries that are not formulated in the form of a question. This module converts the query into a set of partially specified queries which are then given to an Information need fulfilling engine, for example, as described in pending U.S. patent application Ser. No. 09/559,223 entitled "System for Fulfilling an Information Need", (hereinafter "the Information Need application") filed Apr. 26, 2000.

It should be noted that the input query may be processed to obtain both the documents at step 86 and the answers at step 90 such that the documents and answers may be output and displayed as a single set of query results 92. An embodiment may alternatively output only one of the documents or answers as the query results. Additionally, an embodiment may query documents using the inferred answer, or in accordance with the original input query, and/or variations thereof.

Figure 9:
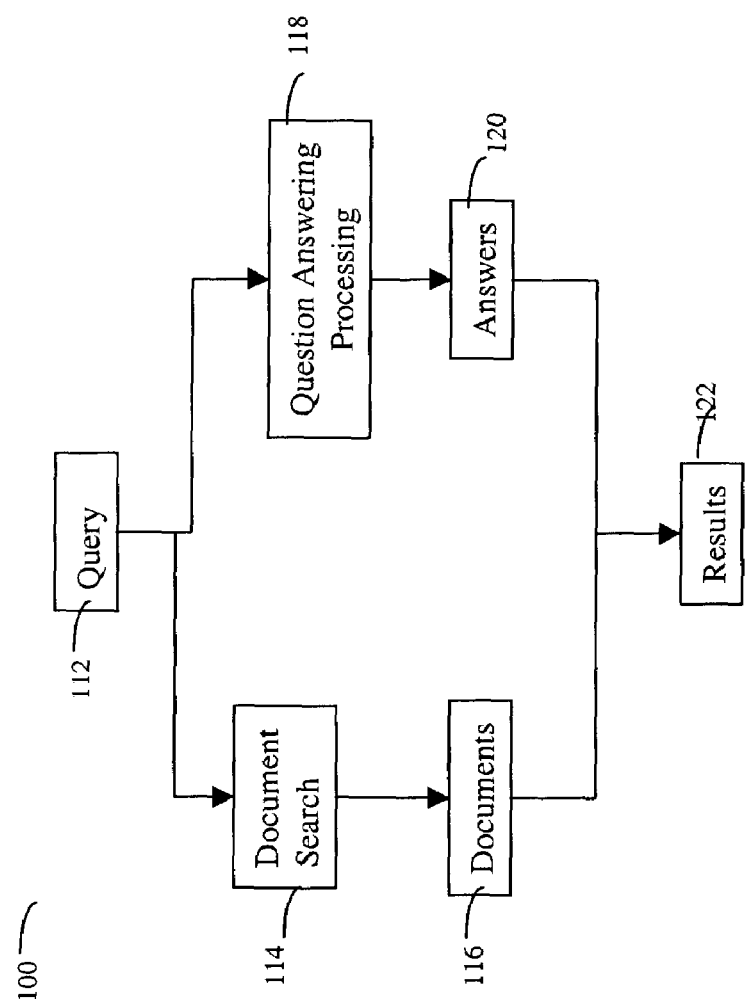
FIG. 9 is an example of a flowchart of steps of a method for providing document search and question-answering processing of queries that may not correspond to natural language questions.

Referring now to FIG. 9, shown is a flowchart 100 of steps of another method for processing an input query that may not correspond to a natural language question. The steps of flowchart 100 may be performed as an alternative in an embodiment to those processing steps described in connection with the flowchart 80 of FIG. 8. A query may be input at step 112. At step 114, the input query may be processed by a traditional document search system which produces as output documents at step 116. The input query may also be processed a step 118 by a QUESTION ANSWERING PROCESSING Module which outputs answers at step 120 for queries that are not formulated in the form of a question. The processing at step 118 is described in more detail elsewhere herein and may be used to convert the input query into a set of fully formed questions which are then given to a question answering system such as described in pending U.S. patent application Ser. No. 09/845,571 entitled "System for Answering Natural Language Questions", (hereinafter "the Question Answering application") filed Apr. 30, 2001.

Figure 10:
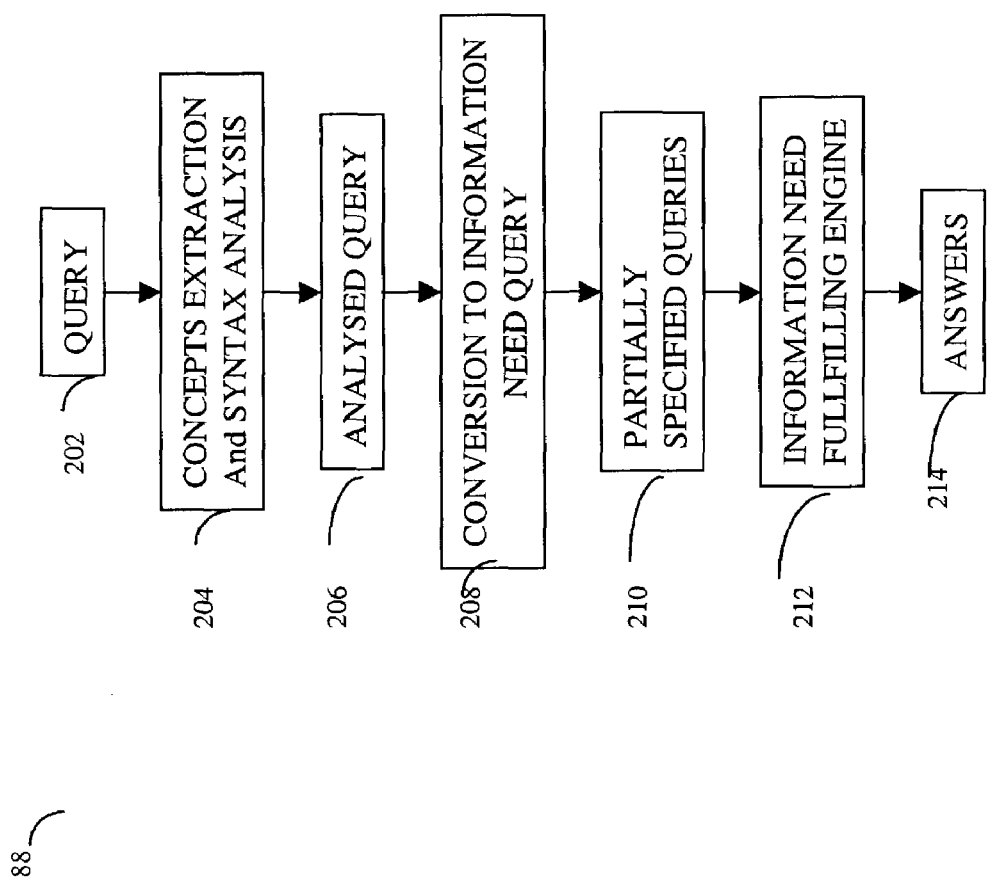
FIG. 10 is an example of a flowchart of steps of a method for information need processing.

Referring now to FIG. 10, shown is a flowchart 88 for performing information needs processing as may be performed by the information needs processing module described elsewhere herein. At step 202, a query is input. This query may not be in the form of a natural language question but may rather consist of, for example, several words. At step 204, concept extraction and syntax analysis is performed on the input query by the CONCEPT EXTRACTION AND SYNTAX ANALYSIS Module described elsewhere herein to produce an analyzed query 206. At step 208, the analyzed query is then converted into a set of partially specified queries 210 by the CONVERSION TO INFORMATION NEED QUERY MODULE which is described elsewhere herein. The partially specified queries output at step 210 may then be processed at step 212 by the INFORMATION NEED FULLFILLING ENGINE as also described elsewhere herein, to produce as output the answers at step 214.

Figure 15:
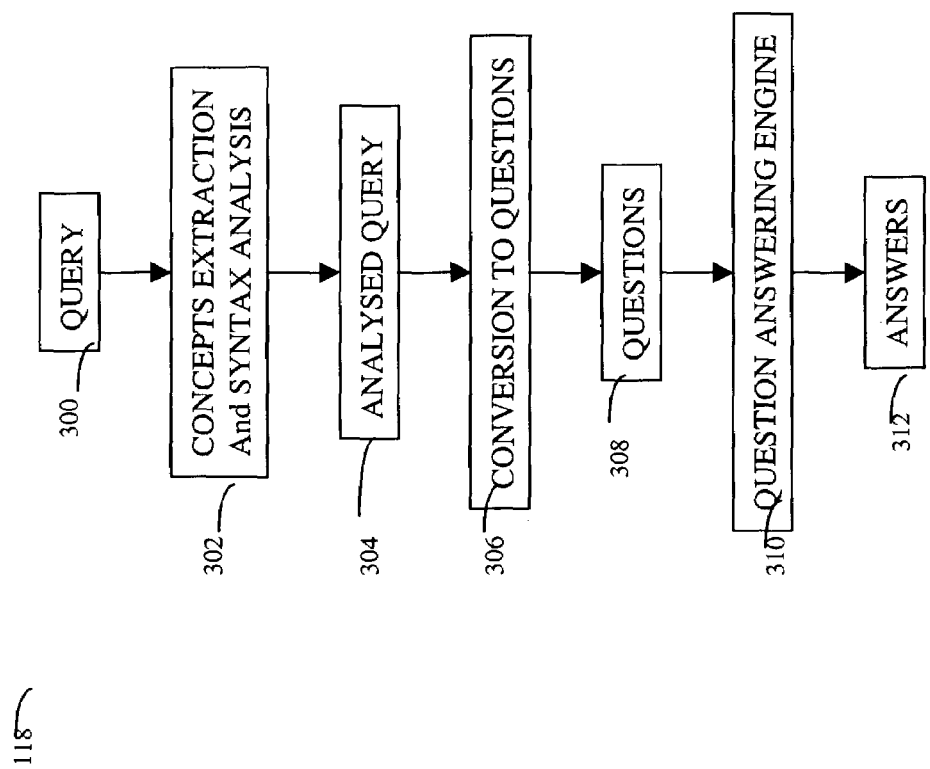
FIG. 15 is an example of a flowchart of steps of a method for providing Question Answering Processing.
Figure 17:
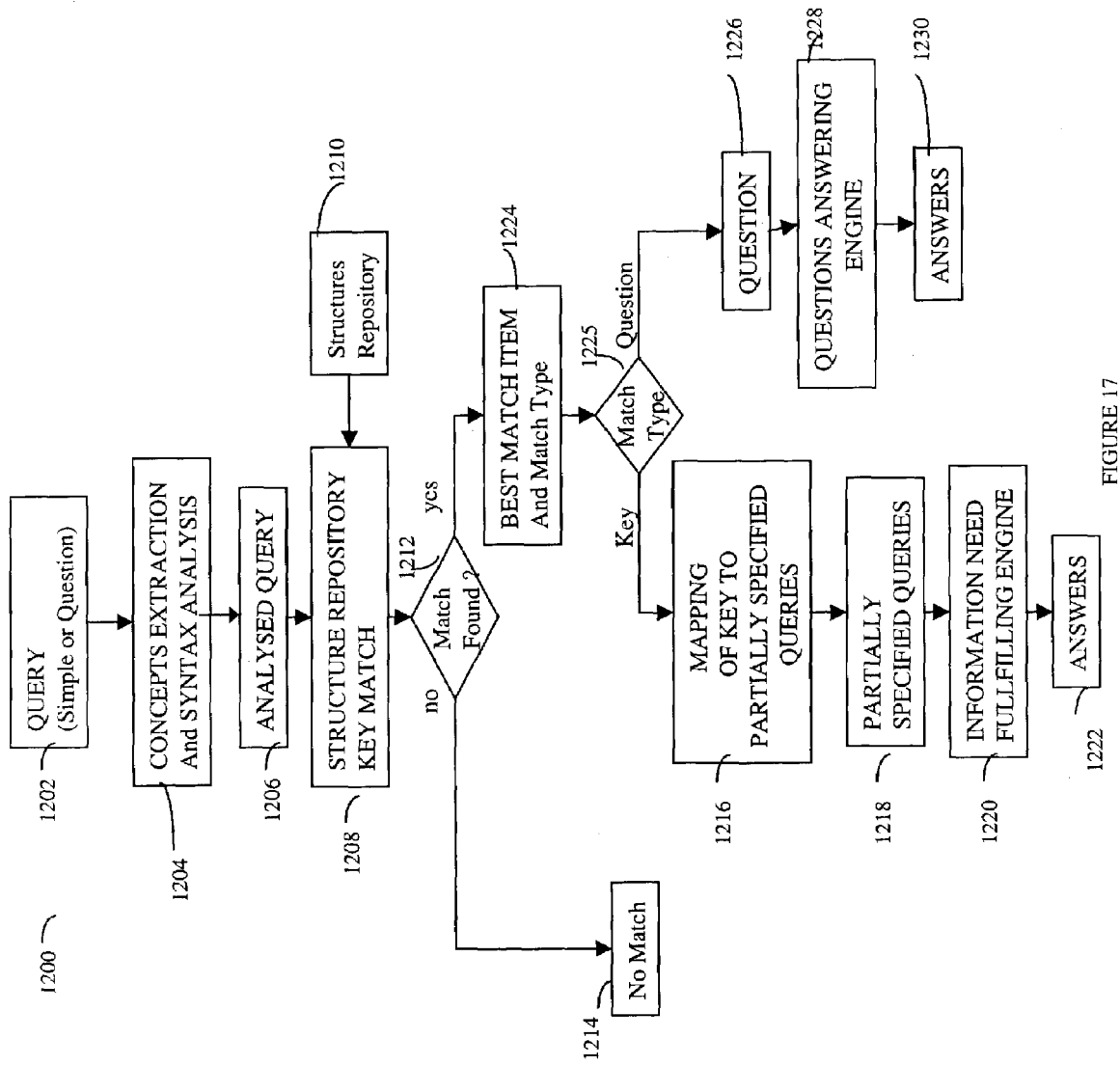
FIG. 17 is an example of a flowchart of steps of a method for query and question processing.

The CONCEPTS EXTRACTION and SYNTAX ANALYIS module as referenced, for example, in FIG. 10, FIG. 15, and FIG. 17 described elsewhere herein, takes as input a query, such as capital of Pakistan, and produces an analyzed query. The analyzed query may be characterized as representing, for example, the morphological, syntactical and conceptual analysis of the input query. The analyzed query and associated processing will now be described in more detail.

Figure 11:
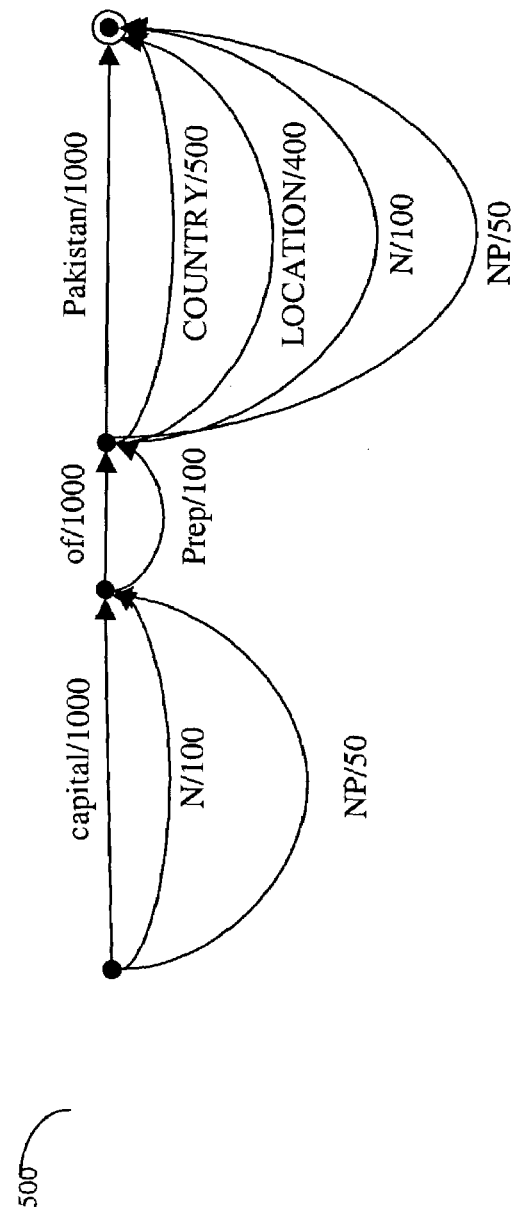
FIG. 11 is an example of an analyzed query with extracted concepts.

Referring now to FIG. 11, shown is an example representation 500 of the analyzed input query capital of pakistan. The analyzed query includes the information of the representation of 500 which is in the form of a finite state machine with the nodes representing states and directed arcs representing alternative transitions between states. Alternative transitions, such as "capital", "N" representing "noun" and "NP" representing "noun phrase" may be weighted in accordance with a number or a weight which represents the degree of specificity of the analysis. In order to identify terms or groups of terms that satisfy more complex morphological, syntactical or conceptual analysis such as Noun Phrase(NP), Country, Noun (N), Location, etc., the CONCEPTS EXTRACTION AND SYNTAX ANALYSIS MODULE may use any of a variety of known techniques of text analysis. Techniques for parsing, performing morphological, syntactic analysis as well as conceptual analysis, etc. are described, for example, in Collins, M., *Three Generative, Lexicalized Models for Statistical Parsing*, Proceedings of the 35$^{th}$ Annual Meeting of the ACL (jointly with the 8$^{th}$ Conference of the EACL, Madrid, 1997; Collins, M., A New Statistical Parser Based on Bigram Lexical Dependencies. Proceedings of the 34$^{th}$ Annual Meeting of the Association for Computational Linguistics (ACL), pages 184–191, 1996; Magerman, D., *Statistical Decision-Tree Models for Parsing*. Proceedings of the 33$^{rd}$ Annual Meeting of the ACL, pp. 276–283, 1995; Woods, W. A., *Transition Network Grammars for Natural Language Analysis*, Communications of the ACM, Vol. 13, No. 10, October, 1970; Roche, E., *Looking for Syntactic Patterns in Texts* in Papers in Computational Lexicography. Complex '92, Kiefer, F., Kiss, G., and Pajzs, J. (eds.) Linguistic Institute, Hungarian Academy of Sciences, Budapest, pp. 279–287; Karp, Schabes, Zaidel, and Egedi, *A Freely Available Wide Coverage Morphological Analyzer for English*, Proceedings of the 15$^{th}$ International Conference on Computational Linguistics, Nantes, pp. 950–954, 1992.

It should be noted that although a finite state machine is used to represent the analyzed query, other representations may be used.

As described above, FIG. 11 shows a representation of the resulting analyzed query for the input query capital of Pakistan. The word capital from the input query may be analyzed as a noun (N), as well as a noun phrase (NP). The word of may be analyzed as a preposition (Prep), and the word Pakistan may be analyzed as a country (COUNTRY), a location (LOCATION), a noun (N) or a noun phrase (NP). Each of the elementary analyses (such as N, NP, COUNTRY, LOCATION, Prep, . . . ) is associated with a number or a weight, such as from 0 to 1000 in accordance with the specificity of the analysis. In this example, a weight of 1000 represents the most specific i.e. the word itself, and a weight of 0 represents the least specific. For example, a word like Pakistan is associated the weight 1000 since it is a word representing a specific instance. The concept COUNTRY is associated the weight 500 since it is less specific than a particular word such as Pakistan. The concept LOCATION may be associated with a weight of 400 since it is less specific than COUNTRY and similarly the tag noun (N) may be associated with a weight of 100 being less specific than location, country and the word Pakistan. Prior to performing the analysis, the particular weights may be associated with different alternative analysis results and associated transitions such as, for example, parts-of-speech tags (noun, verb, adjective, . . . ), the syntactic phrases (noun phrase, verb phrase, . . . ), and the concepts (country, location, city, title, name, date, football player, baseball player, . . . ).

The weight of an analysis may be computed as the sum of the weight of each of its components. For example, the weight of the analysis capital of LOCATION is 2400 (1000+100+400), the sum of the weight of capital, 1000, the weight of the word of, 1000 and the weight of LOCATION, 400. Although the Finite State Machine is one representation of the different alternative analysis results, the analysis result alternatives may be listed instead as follows:

capital of Pakistan: 3000
capital of COUNTRY: 2500
capital of LOCATION: 2400
capital of N: 2100
capital of NP: 2050
capital Prep Pakistan: 2100
capital Prep COUNTRY: 1600
capital Prep LOCATION: 1500
capital Prep N: 1200
capital Prep NP: 1150
N of Pakistan: 2100
N of COUNTRY: 1600
N of LOCATION: 1500
N of N: 1200
N of NP: 1150
NP of Pakistan: 2050
NP of COUNTRY: 1550
NP of LOCATION: 1450
NP of N: 1150
NP of NP: 1100
:
:

Processing steps that may be performed by the CONCEPT EXTRACTION AND SYNTAX ANALYSIS module are described in the pending U.S. patent application Ser. No. 09/559,223, filed Apr. 26, 2000, entitled SYSTEM FOR FULFILLING AN INFORMATION NEED. It should be noted that in this embodiment, the weights may be stored with the associated arc values, for example, as shown in FIG. 11. Other embodiments may store and retrieve the weights using other techniques.

Figure 12:
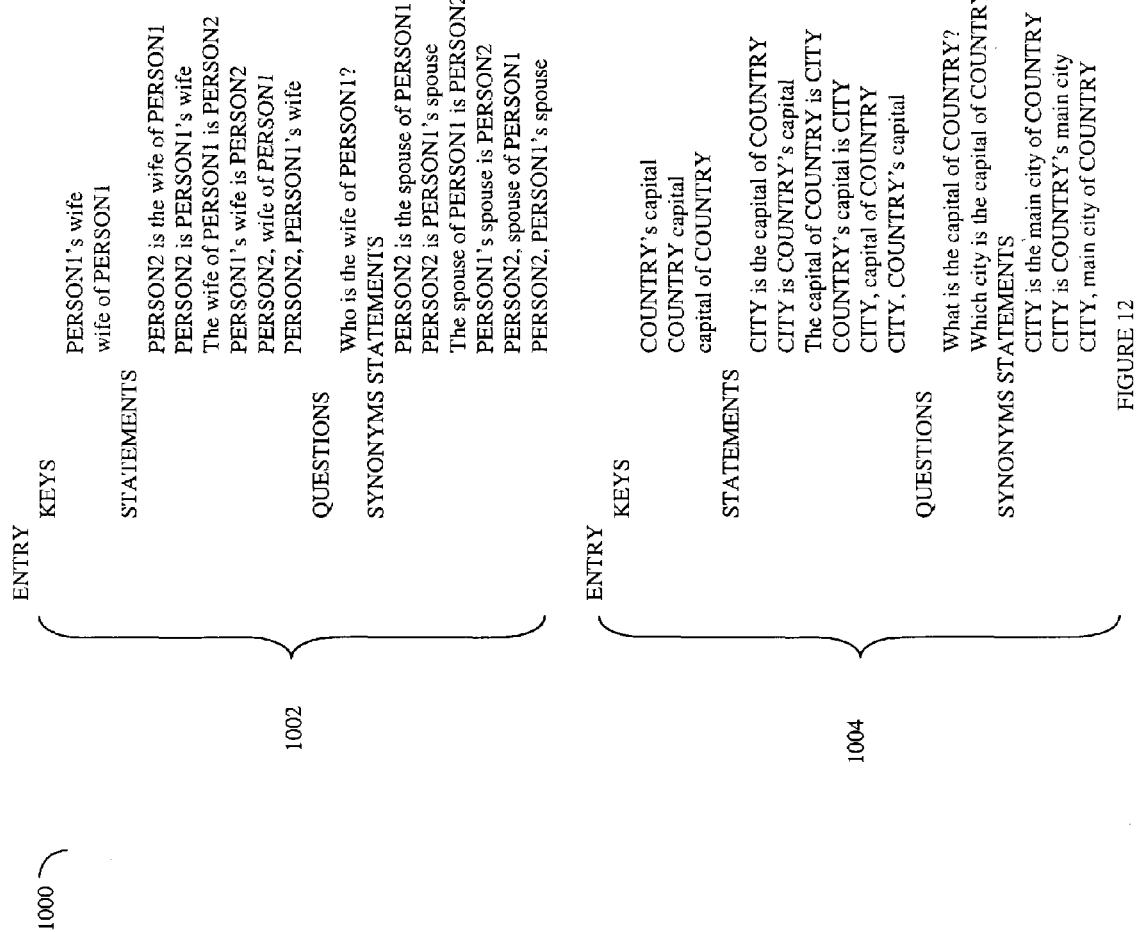
FIG. 12 is an example of a representation of sample entries found in a data structure repository.

Referring now to FIG. 12, shown is an example of a representation 1000 of a Structures Repository. Use of the Structures Repository is described elsewhere herein. Generally, the Structures Repository may be characterized as describing recognized formats of input queries and associated alternatives of terms, concepts, and the like, included in the input queries. For example, an input query may include several terms of a general format (KEY field) and the Structures Repository may include alternative question forms (QUESTION field) of the input query.

In this example, the representation 1000 includes a set of entries 1002 and 1004. Each ENTRY includes the fields: KEYS, STATEMENTS, QUESTIONS and SYNONYMS STATEMENTS. Other embodiments may also include other fields with various information. The KEY fields represent possible alternative ways that the information need may be set forth in an input query rather than in the form of a question. As described elsewhere herein, if an input query matches one of the KEY fields, it may be inferred that the user's information need is related to the answer to a question. The STATEMENTS fields represent possible alternative ways in which the same information need may be set forth in affirmative statements. The QUESTIONS fields correspond to possible questions which convey the same information need (see the Question Answering application).

The SYNONYMS STATEMENTS fields represents synonym variations of the STATEMENTS.

Each ENTRY may include alternative representations and forms of a set of related terms used to express an information need conveyed in an input query. For example, the elationship capital of, represents a relationship between a city and a country. Possible, STATEMENTS of such relationship are:

CITY is the capital of COUNTRY
CITY is COUNTRY's capital
The capital of COUNTRY is CITY
COUNTRY's capital is CITY
CITY, capital of COUNTRY
CITY, COUNTRY's capital The above information is associated with the STATEMENTS portion of the ENTRY.

Possible synonyms statements are
CITY is the main city of COUNTRY
CITY is COUNTRY's main city
CITY, main city of COUNTRY The above information is associated with the SYNONYMS STATEMENTS.

Similarly, possible questions for the relationship are
What is the capital of COUNTRY?
Which city is the capital of COUNTRY?

The above information is associated with the QUESTIONS portion of the ENTRY.

Additionally, the following are ways to express the information need, as may be set forth in the input query, without formulating a question as may be set forth in the QUESTIONS fields:

COUNTRY's capital
COUNTRY capital
capital of COUNTRY

The above information is associated with the KEY fields.

The Structure Repository may be characterized as including information about the concepts, relationships and syntactic structures of a language and various terms. The information included in the Structures Repository may be determined manually prior to processing a data query.

Figure 13:
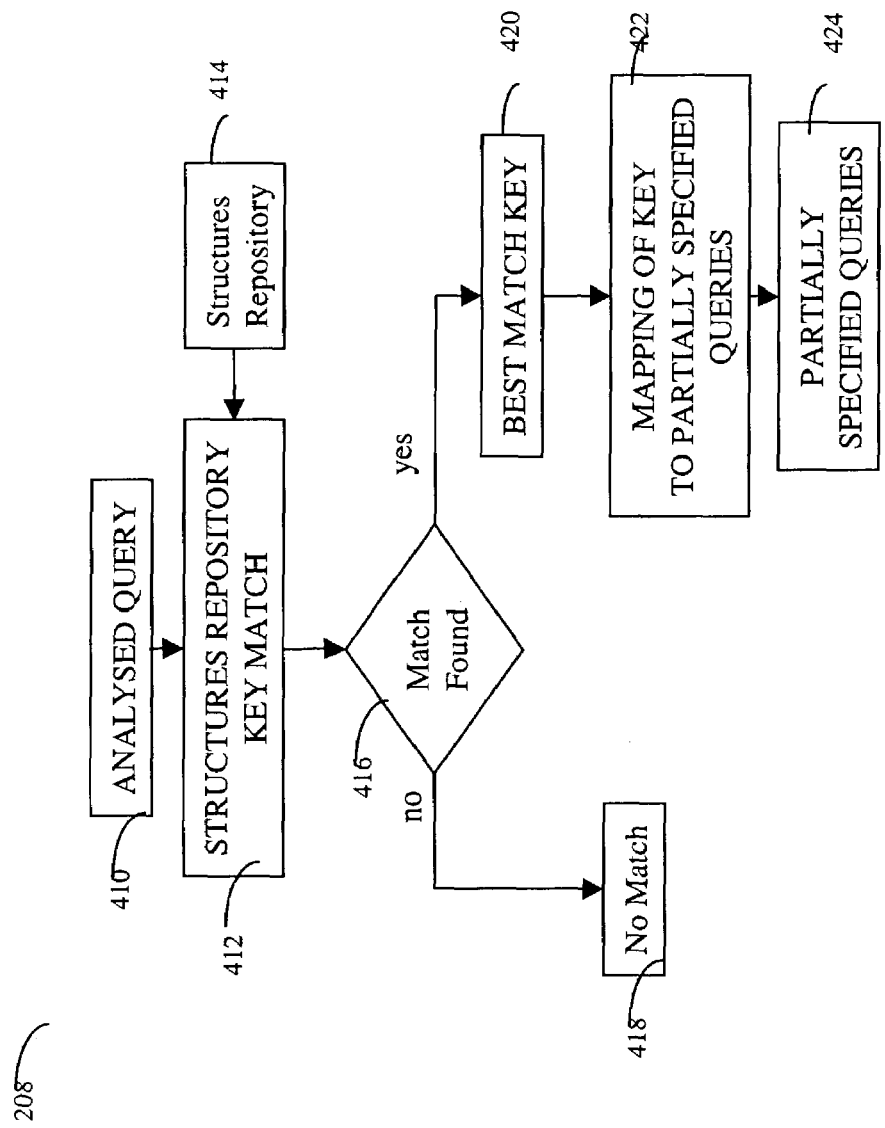
FIG. 13 is an example of a flowchart of steps of a method for converting an analyzed query to partially specified queries.

Referring now to FIG. 13, shown is a flowchart 208 of steps of a method performed in converting the analyzed query into the partially specified queries. The method steps of flowchart 208 may be performed by the Conversion to Information Need Query Module as described elsewhere herein. The Analyzed query 410 is matched, at step 416, against data included in the Structures Repository 414 by the STRUCTURES REPOSITORY KEY MATCH Module 412 described in elsewhere herein. If no match is found, control proceeds to step 418 where the query is classified as not being an information seeking query and no partially specified queries are returned. If, at step 416, a match is found, the best match key is returned at step 420 by the STRUCTURE REPOSITORY KEY MATCH module. At step 422, the best match key is converted to partially specified queries by the MAPPING OF KEY TO PARTIALLY SPECIFIED QUERIES Module described elsewhere herein to produce partially specified queries 424.

Figure 14:
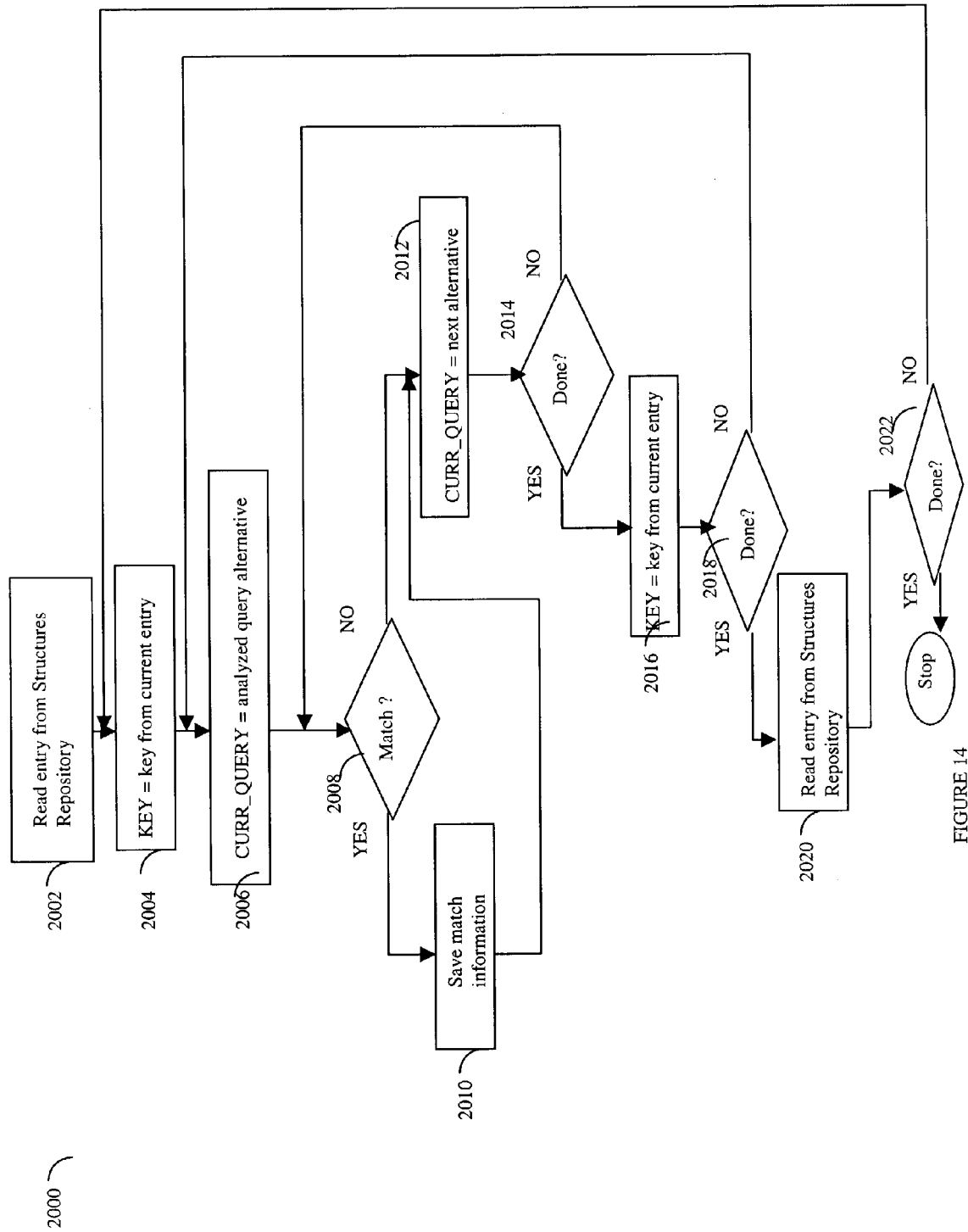
FIG. 14 is a flowchart of steps of a method for determining if there is match of the input query with an entry in the structures repository.

Referring now to FIG. 14, shown is an example of a flowchart 2000 of steps of a method of one embodiment for determining if there is a KEY match in the Structures Repository for an Analyzed Query. It should be noted that the flowchart 2000 performs a comparison of the analyzed query alternatives to the ENTRY values. The processing steps of flowchart 2000 may be performed, for example, by the STRUCTURES REPOSITORY KEY MATCH MODULE described elsewhere herein.

At step 2002, a first ENTRY is read from the Structures Repository. At step 2004, a variable KEY is assigned the first of the KEYS for the current ENTRY. At step 2006, a variable CURR_QUERY is assigned an analyzed query alternative. Recall that an analyzed query alternative includes terms associated with transitions specified previously in connection with the finite state machine from a start to an end node. At step 2008, a determination is made as to whether the current analyzed query alternative matches the current KEY. If so, control proceeds to step 2010 where information about the match, such as the weight, is saved. Control proceeds to step 2012. If the match fails at step 2008, control proceeds to step 2012 without step 2010 processing. At step 2012, the CURR_QUERY is assigned the next analyzed query alternative. At step 2014, a determination is made as to whether all the analyzed query alternatives have been compared to the current KEY. If not, control proceeds to step 2008. Otherwise, control proceeds to step 2016 where the next KEY from the current ENTRY is obtained. At step 2018, a determination is made as to whether all KEYS of the current ENTRY have been processed. If not, control proceeds to step 2006. Otherwise, control proceeds to step 2020 where the next ENTRY is read from the repository. At step 2022, a determination is made as to whether all the ENTRY structures from the repository have been processed. If so, processing stops. Otherwise, control proceeds to step 2004.

What will now be described is an example of how the foregoing method steps of flowchart 2000 may be used to match an analyzed query against ENTRY information from the Structure Repository of FIG. 12. The example uses the input query capital of Pakistan having the analyzed query of FIG. 11.

The first Entry of the Structures Repository is considered, and the two KEYS of this entry
PERSON1's wife
wife of PERSON1 are matched one by one against the analyses of the query capital of Pakistan as illustrated in FIG. 11. The analyzed query does not match the foregoing KEYS.

The module proceeds to the next entry and the keys associated with this entry
COUNTRY's capital
COUNTRY capital
capital of COUNTRY are matched one by one against the analyses of the query capital of Pakistan as illustrated in FIG. 11. When a finite-state machine is used for representing the analyses as it is the case in FIG. 11, each key, is taken as input to the finite-state machine. If a final state is reached, then the key matches the analyses represented by the path into the finite-state machine. In our example, the third key matches and the associated weight is 2500 with the following match:

capital/1000+of/1000+COUNTRY/500 (Pakistan)

The concept COUNTRY matches the input word Pakistan and this word is recorded in the match. Multiple words may be associated with a concept and recorded in connection with match processing. For example the Duchy of Luxembourg match the concept COUNTRY, and the four words the Duchy of Luxembourg are associated with COUNTRY. The KEY and the associated matching words with its weight are added to the set of matched and records, for example, as recorded as step 2010.

Processing proceeds until attempts are made to match the keys of all entries. Then, the key with the highest weight is selected (if there is more than one key with the highest weight, one of those keys is chosen). In our example, the key capital of COUNTRY(Pakistan) is returned as best match key.

The STRUCTURES REPOSITORY KEY MATCH MODULE, as described above, produces as an output a best matched key determined in accordance with the input query. The best matched key may then be an input to the MAPPING OF KEY TO PARTIALLY SPECIFIED QUERIES MODULE which converts this best matched key to one or more partially specified queries. The MAPPING OF KEY TO PARTIALLY SPECIFIED QUERIES MODULE proceeds by selecting the STATEMENTS associated with the entry in the Structures repository corresponding to the given best key. Subsequently, the concepts specified in the input query which are associated with words in the key are substituted instead of the corresponding concepts into the statements. The remaining concepts which are not associated with any word in the statements are then converted into the corresponding partially unspecified query with the restriction associated with the concept.

Consider the following example. If the key with the associated words is:
   capital of COUNTRY (Pakistan)
   using the Structure repository shown in FIG. 12 the second ENTRY:

ENTRY
      KEYS
         COUNTRY's capital
         COUNTRY capital
         capital of COUNTRY
      STATEMENTS
         CITY is the capital of COUNTRY
         CITY is COUNTRY's capital
         The capital of COUNTRY is CITY
         COUNTRY's capital is CITY
         CITY, capital of COUNTRY
         CITY, COUNTRY's capital
      QUESTIONS
         What is the capital of COUNTRY?
         Which city is the capital of COUNTRY?
      SYNONYMS STATEMENTS
         CITY is the main city of COUNTRY
         CITY is COUNTRY's main city
         CITY, main city of COUNTRY is selected since capital of COUNTRY matches on of its key, capital of COUNTRY. Then the corresponding statements are selected:
   CITY is the capital of COUNTRY
   CITY is COUNTRY's capital
   The capital of COUNTRY is CITY
   COUNTRY's capital is CITY
   CITY, capital of COUNTRY
   CITY, COUNTRY's capital The words associated with concepts and phrases in the key are substituted to the statements, i.e. Pakistan is substituted for COUNTRY in the statements to produce:
   _CITY is the capital of Pakistan
   _CITY is Pakistan capital
   The capital of Pakistan is CITY
   Pakistan's capital is CITY
   CITY, capital of Pakistan
   CITY, Pakistan's capital The remaining concepts are converted into partially unspecified portions with their corresponding restriction, in this case CITY is replaced by _[CITY] which is a partially unspecified portion which matches any city. This process produces the following partially unspecified queries:
   _[CITY] is the capital of Pakistan
   _[CITY] is Pakistan capital
   The capital of Pakistan is _[CITY]
   Pakistan's capital is [CITY]
   _[CITY], capital of Pakistan
   _[CITY], Pakistan's capital In addition, the synonyms statements can also be used to produce the following partially queries:
   _[CITY] is the main city of Pakistan
   _[CITY] is Pakistan's main city
   _[CITY], main city of Pakistan The INFORMATION NEED FULFILLING ENGINE then searches documents using these queries to produce answer results for the unspecified portions, such as _[CITY]. These results ("Islamabad" in this example) for the unspecified portions may be used as the Answers in this embodiment.

Referring now to FIG. 15, shown is a flowchart 118 of steps of a method that may be performed in connection with question answering processing. These method steps may be performed, for example, by the question answering processing module described elsewhere herein. The input query 300 is first analyzed at step 302 to reveal syntactic analyses as well as to reveal concepts found in the query by the CONCEPT EXTRACTION AND SYNTAX ANALYSIS Module described in elsewhere herein. The resulting analyzed query 304 is converted at step 306 into a set of questions 308 by the CONVERSION TO QUESTIONS MODULE which is described elsewhere herein. The questions 308 are processed by a QUESTION ANSWERING Engine 310, for example such as described in the Question Answering application, to output answers. It should be noted that other techniques and engines besides those described herein may be used in formulating answers from questions.

Figure 16:
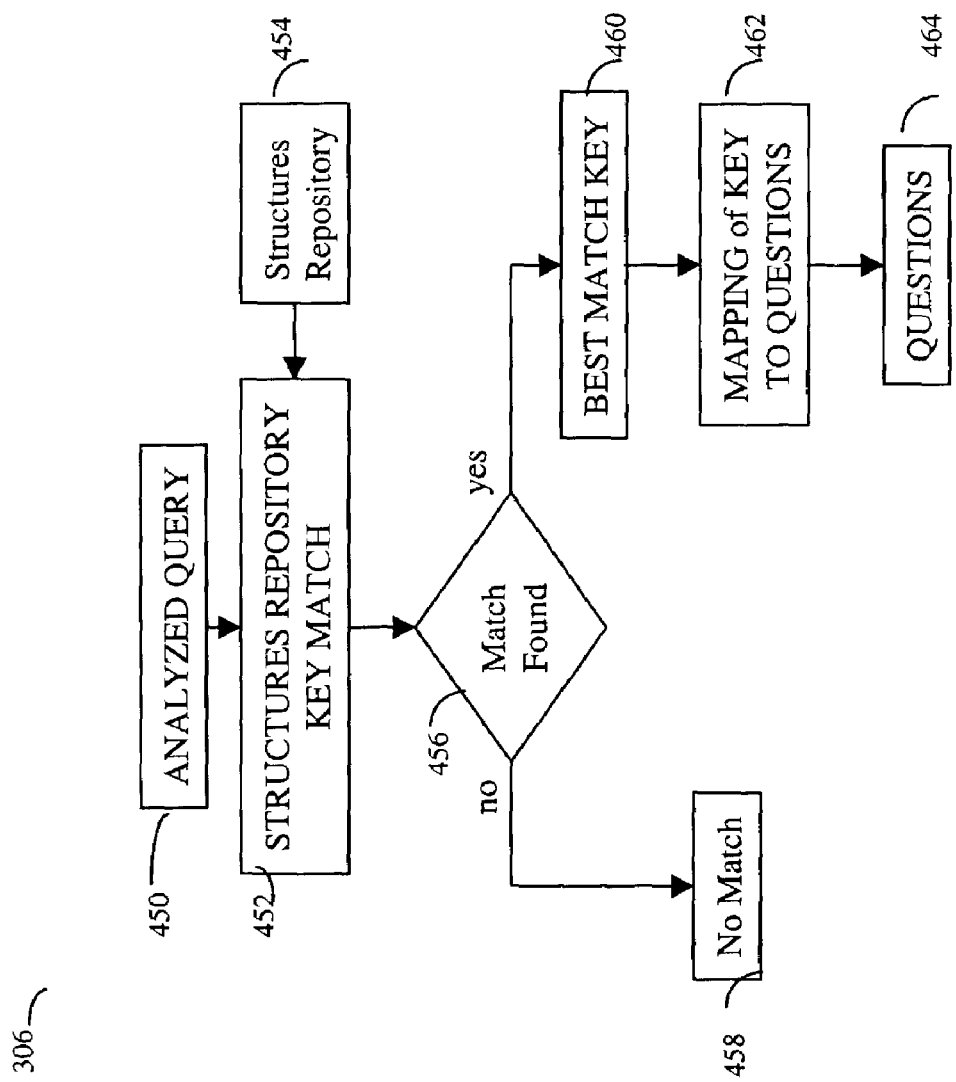
FIG. 16 is an example of a flowchart of steps of a method for converting a query to a question.

Referring now to FIG. 16, shown is a flowchart 306 of steps of a method for converting an input query to a question. The steps of flowchart 306 may be performed, for example, by the Conversion to Questions Module described elsewhere herein. At step 456, the Analyzed query 405 is matched against data from the Structures Repository 454 by the STRUCTURES REPOSITORY KEY MATCH Module 452 described elsewhere herein. If no match is found, control proceeds to step 458 where the query is classified as not being an information seeking query and no questions are returned. If, at step 456, a match is found, control proceeds to step 460 where the best match key is returned by the STRUCTURE REPOSITORY KEY MATCH module. The best match key is converted at step 462 to questions by the MAPPING OF KEY TO QUESTIONS Module described elsewhere herein to produce questions 464.

Processing within the MAPPING OF KEY TO QUESTION MODULE is similar to the processing described elsewhere herein in connection with the MAPPING OF KEY TO PARTIALLY SPECIFIED QUERIES MODULE. However, the MAPPING OF KEY TO QUESTION MODULE selects questions from the QUESTIONS entry field rather than the STATEMENTS entry field.

For example, if the key with the associated words is:
   capital of COUNTRY (Pakistan)
   using the Structure repository shown in FIG. 12, the second ENTRY:

```
ENTRY
    KEYS
        COUNTRY's capital
        COUNTRY capital
        capital of COUNTRY
    STATEMENTS
        CITY is the capital of COUNTRY
        CITY is COUNTRY's capital
        The capital of COUNTRY is CITY
        COUNTRY's capital is CITY
        CITY, capital of COUNTRY
        CITY, COUNTRY's capital
    QUESTIONS
        What is the capital of COUNTRY?
        Which city is the capital of COUNTRY?
    SYNONYMS STATEMENTS
        CITY is the main city of COUNTRY
        CITY is COUNTRY's main city
        CITY, main city of COUNTRY
```

Is selected since capital of COUNTRY matches on of its key, capital of COUNTRY. The corresponding questions are selected:

What is the capital of COUNTRY?
Which city is the capital of COUNTRY?

Then the words associated with concepts or phrases in the key are substituted to the statements, i.e. Pakistan is substituted for COUNTRY in the statements to produce questions:

What is the capital of Pakistan?
Which city is the capital of Pakistan?

What will now be described are method steps for processing an input query to produce an answer using the foregoing ENTRY Structures.

Referring now to FIG. 17, shown is a flowchart 1200 of method steps of one embodiment for processing an input query for producing answers when the input query may not be in the form of a question. Flowchart 1200 specifies in more detail processing steps associated with flowcharts 80 and 100.

At step 1202, an input query is obtained, for example, as by using a graphical user interface with an input device as described elsewhere herein. At step 1204, CONCEPTS EXTRACTION and SYNTAX ANALYSIS is performed to produce the analyzed query 1206. The Structures Repository 1210 is searched at step 1208 to determine whether there is a match of the input query with a KEY included in a defined ENTRY. If, at step 1212, it is determined that there is no match of an ENTRY for the input query, control proceeds to step 1214 where output may be produced indicating that no match has been found. If, at step 1212, it is determined that at least one match has been found, control proceeds to step 1224 where the best match item is selected, for example, based on predetermined weights.

Control proceeds to step 1225 where further processing continues in accordance with the type of match. In this example, the type may be one of KEY or QUESTION. If the type is KEY, control proceeds to step 1216 where a mapping of the key to partially specified queries is performed to produce the partially specified queries 1218. The partially specified queries 1218 are input to the Information Need Fulfilling Engine 1220 to produce answers 1222. An embodiment utilizing partially specified questions and processing as may be performed by the Information Need Fulfilling Engine are described in, for example, pending U.S. patent application Ser. No. 09/559,223, filed Apr. 26, 2000, entitled SYSTEM FOR FULFILLING AN INFORMATION NEED and pending U.S. patent application Ser. No. 10/004,952, filed Dec. 5, 2001, entitled SYSTEM FOR FULFILLING AN INFORMATION NEED USING AN EXTENDED MATCHING TECHNIQUE. Other embodiments may specify queries in other formats having different capabilities in connection with searching.

If the type is a QUESTION, the question 1226 is input to a Questions Answering Engine 1228 to output the Answers 1230. It should be noted that an embodiment of the Questions Answering Engine is described, for example, in pending U.S. patent application Ser. No. 09/845,571, filed Apr. 30, 2001, entitled SYSTEM FOR ANSWERING NATURAL LANGUAGE QUESTIONS. Other embodiments may utilize other Questions Answering Engines.

The STRUCTURES REPOSITORY KEY MATCH MODULE, as referred to, for example, in FIGS. 14–16, determines whether there is a match of one of the alternatives of the analyzed query with the KEY entries of the Structures Repository. Recall that an alternative of the analyzed query may be formed from a series of consecutive transitions from a start state to an end state of a finite state machine. The associated weight for the alternative may be computed as the sum of the weights associated with each transition. If there is more than one match, the "best" key entry of the Structures Repository which matches the analyzed query as well as the words associated with each concept or analysis found in the key may be selected.

Each alternative of the analyzed query is compared against each of the KEYS of each Entry found in the Structure Repository. If there is a match, the match is recorded with the associated weight. Once all Keys have been compared to all possible alternatives of the analyzed query, the match with the highest weight is identified as the best match (if there is more than one match with the highest weight, one match is chosen either randomly or through some other heuristics). If no match is found in the KEYS, the module returns no match.

The matching of the analyses against a particular one of the KEYS may be performed in a variety of different ways. An embodiment may perform a term by term comparison of each analysis alternative against each term included in each of the KEYS. An embodiment may also identify whether a particular one of the KEYS is recognizable by the finite state machine, for example, by using a KEY as input to the finite-state machine.

Figure 18:
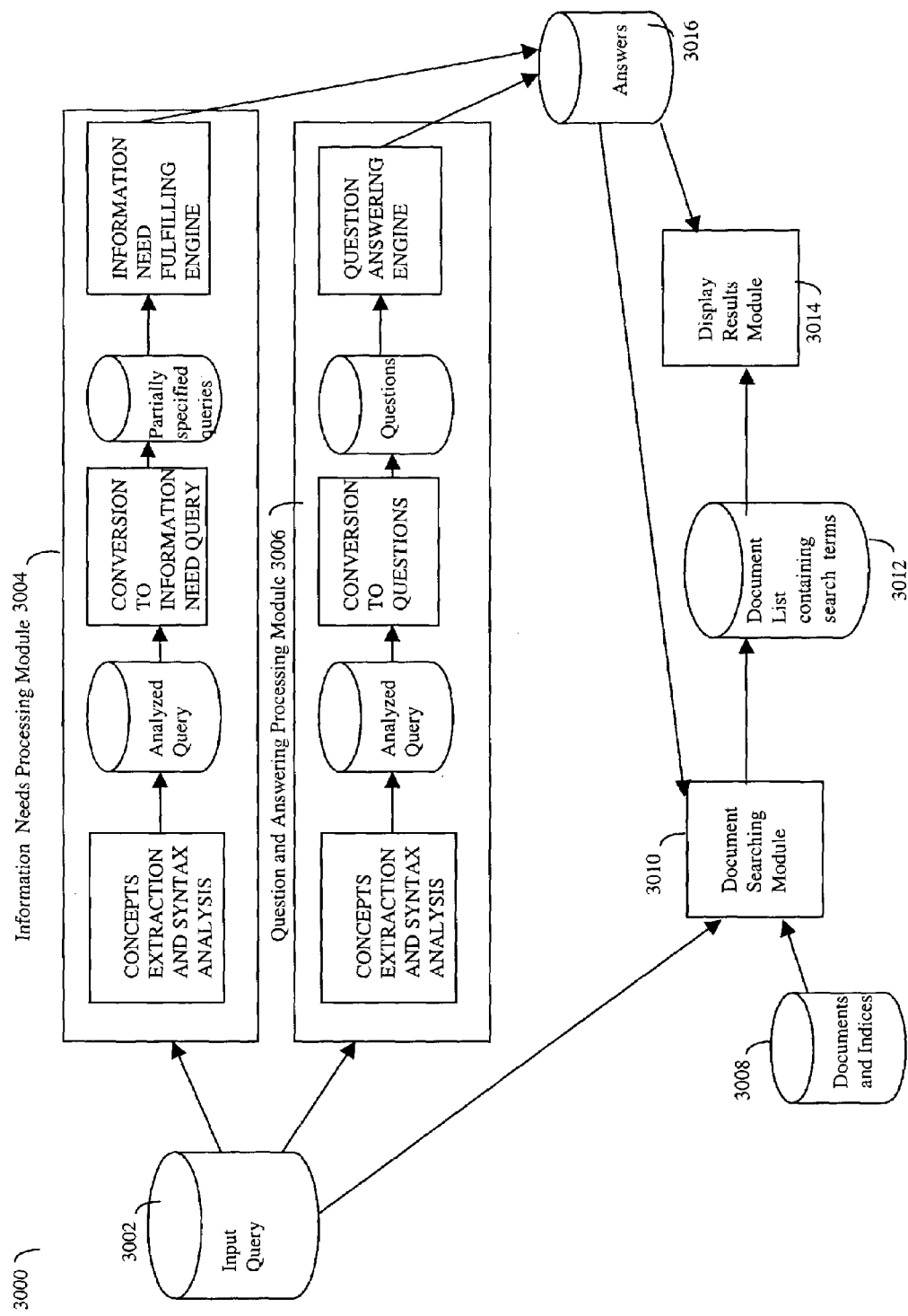
FIG. 18 is an example of an embodiment of components that may be included in the query server system.

Referring now to FIG. 18, shown is an example of an embodiment of components described herein that may be included in an embodiment of the query server system 612. An input query 3002 may be input to the Information Needs Processing Module 3004 and/or the Question and Answering Processing Module 3006, and/or the Document Searching Module 3010. The Information Needs Processing Module 3004 and the Question and Answering Module 3006 produce as output Answers 3016. The Answers may be displayed on a user output device by the Display Results Module 3014. Additionally, an embodiment may search documents 3008 using the Document Searching Module 3010 for Answers 3016. As an output, the Document Searching Module produces a document list including the search terms. This document list may also be displayed by the display results module 3014 on an output device.

The Information Needs Processing Module 3004 performs CONCEPTS EXTRACTION AND SYNTAX ANALYSIS to produce an Analyzed Query. The Analyzed Query is input to the CONVERSION TO INFORMATION NEED QUERY processing to output partially specified queries. The partially specified queries are input to the INFORMATION NEED FULFILLING ENGINE that outputs Answers 3016.

The Question and Answering Processing Module 3006 performs CONCEPTS EXTRACTION AND SYNTAX ANALYSIS to produce an Analyzed Query. The Analyzed Query is input to the CONVERSION TO QUESTIONS processing to output Questions. The Questions are input to the QUESTION ANSWERING ENGINE that outputs Answers 3016.

Using the techniques described herein, an input query may be analyzed to infer a user information need that may not be explicitly set forth in the input query. Described herein as an example is an input query that is not in the form of a question. By analyzing the input query, a question in one or more variations may be formulated to derive the underlying user request. That is, the user may be seeking the answer to a question formulated from search query terms not in the form of a question. Analyzed input request results may also be used to formulate one or more affirmative statements to obtain derivative user information not explicitly set forth in the input query. Accordingly, documents may be searched based on the obtained derivative information, such as, for example, the answer to the formulated questions, or a term in an affirmative statement. The user information need may be determined without using predetermined tags Referring back to FIG. 12, it should be noted that the structures described may be stored in database records, or other data structures. The particular order in which various fields are defined in an ENTRY may set forth a processing order in which an information need may be fulfilled. For example, described herein, once at least one KEY has been determined, QUESTION processing and/or STATEMENT processing may be performed. The order in which processing steps may be executed in an attempt to fulfill a user information need, such as an answer, may be determined by the position in the ENTRY. In FIG. 12, the STATEMENT processing may be executed first based on relative position to QUESTION and SYNONYMS STATEMENTS. If an answer is not obtained, QUESTION processing may be subsequently performed. If an answer is not obtained by STATEMENT or QUESTION processing, SYNONYMS STATEMENTS may be used. Modifying the order in which the portions of the ENTRY structure appear may affect the order in which the foregoing processing is done.

An ENTRY structure in an embodiment may also include other portions than as set forth in FIG. 12. For example, an embodiment may include the following elements defined at the same level as the STATEMENTS, SYNONYMS STATEMENTS and QUESTIONS portions:

DATABASE-1 STATEMENTS
SQL-statement-1
SQL-statement-2
DATABASE-2 STATEMENTS
SQL-statement-1
SQL-statement-2

The foregoing may be used to specify a section of one or more database queries that may be in the form of SQL statements or other search terms used by a particular database to be searched. An embodiment may execute the DATABASE-1 STATEMENTS prior to DATABASE-2 STATEMENTS based on the order of occurrence within the ENTRY structure in an embodiment that follows an order of statement execution based on position within the ENTRY structure described above.

An embodiment of the ENTRY structure may also include the following elements defined at the same level as the STATEMENTS, SYNONYMS STATEMENTS and QUESTIONS portions:

APPLICATION STATEMENTS
   APPLICATION1_NAME   PARAM1,   PARAM2, PARAM3
   APPLICATION2_NAME   PARAM1,   PARAM2, PARAM3

Using the foregoing statements in the APPLICATION STATEMENT section, an application may be invoked in connection with performing searching or other operations. The particular application invoked, such as APPLICATION1_NAME, may take as input one or more parameters, such as PARAM1. The parameters may also be output parameters by which the application communicates return information. The parameters may include search terms and other information in accordance with the particular application being invoked.

An embodiment may also include the following elements defined at the same level as the STATEMENTS, SYNONYMS STATEMENTS and QUESTIONS portions:

APPLICATION STATEMENTS

| CONDITION 1 | VALUE | APPLICATION1_NAME | PARAM1 |
| CONDITION 2 | VALUE | APPLICATION2_NAME | PARAM1 |

The foregoing may be used to provide for conditional execution or invocation of an application with evaluation of conditions in a particular order. CONDITION1 may be evaluated in accordance with the specified optional VALUE causing APPLICATION1-NAME to be executed. An embodiment may evaluate all the conditions and invoke one or more applications in accordance with the evaluation. An embodiment may also choose not to continue evaluation of conditions and invocation of applications once a first application has been executed.

The structure set forth in FIG. 12 may be used as a technique for dispatching queries to other sources to obtain answers, as described herein.

While the invention has been described and illustrated in connection with certain preferred embodiments, many variations and modifications as will be evident to those skilled in the art may be made therein without departing from the spirit of the invention, and the invention is thus not to be limited to the precise details of construction set forth above.

What is claimed is:

1. A method implemented on a computer running executable code of fulfilling an information need comprising:
   obtaining an input query including at least one user-specified search term;
   converting said input query into a converted input query;
   using said converted input query to obtain a result wherein said result does not include aid at least one user-specified search term included in said input query;
   wherein said converted input query is an affirmative statement including an unspecified portion, and the method further comprises:
   searching documents for candidate results for the unspecified portion;
   selecting said result from said candidate results;
   further comprising:
   performing a document search using said result as a search term;

performing a document search using said at least one term included in said input query;

analyzing said input query to extract syntactic and contextual information producing an analyzed query;

determining a best key match for said analyzed query by matching said analyzed query with key terms associated with a structure;

forming at least one partially specified query using other data included in said structure;

searching documents using said at least one partially specified query to obtain said candidate results, said at least one partially specified query being said converted query; and selecting said result from said candidate results.

2. The method of claim 1, wherein said result is an answer, said input query is not in the form of a natural language question, and said converted input query is a natural language question.

3. The method of claim 2, further comprising:

using a question-answering engine to obtain said answer; and performing a document search using said answer as a search term.

4. The method of claim 3, further comprising:

performing a document search using said at least one term included in said input query.

5. The method of claim 2, further comprising:

analyzing said input query to extract syntactic and contextual information producing an analyzed query;

determining a best key match for said analyzed query by matching said analyzed query with key terms associated with a structure;

forming at least one question using other data included in said structure, said at least one question being said converted query; and using a question-answering engine to obtain said answer to said at least one question.

6. The method of claim 1, wherein said other data includes at least one statement format.

7. The method of claim 6, wherein said other data includes synonyms for said at least one statement format.

8. The method of claim 7, further comprising:

forming said at least one partially specified query using said at least one statement format;

determining whether candidate results are obtained using said at least one statement format; and conditionally forming and using other partially specified queries using said synonyms if said at least one statement format did not return candidate results.

9. The method of claim 1, further comprising:

formulating partially specified queries using various fields of other data specified in said structure in accordance with a processing order determined by said structure.

10. The method of claim 1, further comprising:

analyzing said input query to extract syntactic and contextual information producing an analyzed query;

extracting information from said analyzed input query to determine if said input query is asking a question; and determining said result using one of said question and an affirmative statement of said question.

\* \* \* \* \*